US010547555B2

(12) United States Patent
Lee et al.

(10) Patent No.: US 10,547,555 B2
(45) Date of Patent: Jan. 28, 2020

(54) METHODS, SYSTEMS, AND COMPUTER READABLE MEDIA FOR REDUCING WI-FI SCANNING USING CELLULAR NETWORK TO WI-FI ACCESS POINT MAPPING INFORMATION

(71) Applicant: North Carolina State University, Raleigh, NC (US)

(72) Inventors: Kyunghan Lee, Cary, NC (US); Injong Rhee, Apex, NC (US); Nithyananthan Poosamani, Coimbatore (IN)

(73) Assignee: North Carolina State University, Raleigh, NC (US)

( * ) Notice: Subject to any disclaimer, the term of this patent is extended or adjusted under 35 U.S.C. 154(b) by 508 days.

(21) Appl. No.: 14/349,571

(22) PCT Filed: Oct. 4, 2012

(86) PCT No.: PCT/US2012/058733
§ 371 (c)(1),
(2) Date: Apr. 3, 2014

(87) PCT Pub. No.: WO2013/052653
PCT Pub. Date: Apr. 11, 2013

(65) Prior Publication Data
US 2014/0287751 A1  Sep. 25, 2014

Related U.S. Application Data

(60) Provisional application No. 61/543,128, filed on Oct. 4, 2011, provisional application No. 61/648,056, filed on May 16, 2012.

(51) Int. Cl.
*H04L 12/807* (2013.01)
*H04W 48/18* (2009.01)
(Continued)

(52) U.S. Cl.
CPC .......... *H04L 47/27* (2013.01); *H04L 41/0896* (2013.01); *H04L 47/225* (2013.01);
(Continued)

(58) Field of Classification Search
CPC ..... H04W 48/16; H04W 48/18; H04W 48/20; H04W 28/0273; H04W 28/0289;
(Continued)

(56) References Cited

U.S. PATENT DOCUMENTS 9,113,391 B2*  8/2015  Gillett .................. H04W 48/04
2006/0193287 A1*  8/2006  Ooshima ............... H04W 88/02
                                                          370/328
(Continued)

OTHER PUBLICATIONS

"Pivot and Unpivot". Arup Nanda. Retrieved https://web.archive.org/web/20130718143928/http://www.oracle.com/technetwork/articles/sql/11g-pivot-097235.html. Publication Date: Jul. 2013. Retrieved Oct. 2017.*
(Continued)

*Primary Examiner* — Nathan A Mitchell
(74) *Attorney, Agent, or Firm* — Kilpatrick Townsend & Stockton LLP

(57) ABSTRACT

The subject matter described herein includes methods, systems, and computer readable media for reducing Wi-Fi scanning using cellular network to Wi-Fi access point mapping information. In one exemplary method, a mobile communications device receives Wi-Fi and cellular signals and creates or obtains a database of mappings between Wi-Fi access points and cellular network information. The mobile communications device detects signals from base stations in the cellular network. The mobile communications device determines at least one recommended access point from the data derived from the database. The mobile communications device determines whether any Wi-Fi signals are present. In response to determining that at least one Wi-Fi signal is (Continued)

present, the mobile communications device attempts to connect to the at least one recommended access point.

19 Claims, 17 Drawing Sheets

(51) Int. Cl.
| | |
|---|---|
| *H04W 48/16* | (2009.01) |
| *H04L 12/24* | (2006.01) |
| *H04L 12/815* | (2013.01) |
| *H04W 28/02* | (2009.01) |
| *H04W 80/06* | (2009.01) |

(52) U.S. Cl.
CPC ... *H04W 28/0273* (2013.01); *H04W 28/0289* (2013.01); *H04W 48/16* (2013.01); *H04W 48/18* (2013.01); *H04W 80/06* (2013.01)

(58) Field of Classification Search
CPC ...... H04W 80/06; H04L 47/27; H04L 47/225; H04L 41/0896
USPC .......................................................... 455/434
See application file for complete search history.

(56) References Cited

U.S. PATENT DOCUMENTS

| | | | | | |
|---|---|---|---|---|---|
| 2007/0001867 | A1* | 1/2007 | Rowe | ................. | G01S 5/02 340/8.1 |
| 2007/0207815 | A1* | 9/2007 | Alfano | ................. | H04W 48/04 455/456.1 |
| 2009/0103503 | A1* | 4/2009 | Chhabra | ............... | H04W 48/20 370/338 |
| 2009/0143078 | A1* | 6/2009 | Tu | ........................ | H04W 8/18 455/456.3 |
| 2009/0258607 | A1* | 10/2009 | Beninghaus | ......... | H04B 1/3805 455/77 |
| 2009/0270091 | A1* | 10/2009 | Joshi | .................... | H04W 48/16 455/434 |
| 2010/0172274 | A1* | 7/2010 | Wu | ....................... | H04W 48/16 370/311 |
| 2010/0232401 | A1* | 9/2010 | Hirsch | .................. | H04W 48/16 370/338 |
| 2011/0105102 | A1* | 5/2011 | Jutzi | .................. | H04W 52/0229 455/419 |
| 2011/0286437 | A1* | 11/2011 | Austin | ................... | H04W 4/02 370/338 |
| 2014/0286190 | A1* | 9/2014 | Vallabhu | ........... | H04W 52/0241 370/254 |

OTHER PUBLICATIONS

"Pivot and Unpivot". Arup Nanda. Retrieved from https://web.archive.org/web/20110221191735/http://www.oracle.com/technetwork/articles/sql/11g-pivot-097235.html Publication Date: Feb. 2011. Retrieved Jun. 2018.*

Lee et al., "Mobile Data Offloading: How Much Can WiFi Deliver?" IEEE, vol. 21, No. 2, pp. 536-550 (Apr. 2013).

Notification of Transmittal of the International Search Report and the Written Opinion of the International Searching Authority, or the Declaration, corresponding to PCT Application No. PCT/US2012/058733 dated Mar. 18, 2013.

Zhang et al., "E-MiLi: Energy-Minimizing Idle Listening in Wireless Networks," IEEE Transactions on Mobile Computing, vol. 11, No. 9, pp. 1441-1454 (Sep. 2012).

Vu et al., "Jyotish: A Novel Framework for Constructing Predictive Model of People Movement from Joint Wifi/Bluetooth Trace, IEEE (2011).

Thiagarajan et al., "Accurate, Low-Energy Trajectory Mapping for Mobile Devices," (2011).

Ravindranath et al., "Improving Wireless Network Performance Using Sensor Hints," (2011).

Paek et al., "Energy-Efficient Positioning for Smartphones using Cell-ID Sequence Matching," MobiSys (2011).

Manweiler et al., "Avoiding the Rush Hours: WiFi Energy Management via Traffic Isolation," MobiSys (2011).

Kim et al., "Improving Energy Efficiency of Wi-Fi Sensing on Smartphones," IEEE INFOCOM (2011).

Paek, "Rate Adaptation in Networks of Wirless Sensors," Defense Talk (Sep. 8, 2010).

Rozner et al., "NAPman: Network-Assisted Power Management for WiFi Devices," MobiSys (2010).

Balasubramanian et al., "Augmenting Mobile 3G Using WiFi," MobiSys (2010).

Wu et al., "Footprint: Cellular Assisted Wi-Fi AP Discovery on Mobile Phones for Energy Saving," WiNTECH (2009).

Lee et al., "SLAW: A Mobility Model for Human Walks," (2009).

Gonzalez et al., "Understanding individual human mobility patterns," Nature, vol. 453, No. 5, pp. 779-782 (Jun. 2008).

Varshavsky et al., "GSM indoor localization," Pervasive and Mobile Computing, vol. 3, pp. 698-720 (Dec. 2007).

LaMarca et al., "Place Lab: Device Positioning Using Radio Beacons in the Wild," (Oct. 2004).

Laasonen et al., "Adaptive On-Device Location Recognition," pp. 287-304 (2004).

Shin et al., "Wake on Wireless: An Event Driven Energy Saving Strategy for Battey Operated Devices," MobiCom (2002).

* cited by examiner (a) Current WiFi vs. DirectWiFi implementation in Android smartphones (b) Energy consumption for different number of connection trials (a) Wasted scans under WiFi (b) Wasted scans under no WiFi

METHODS, SYSTEMS, AND COMPUTER READABLE MEDIA FOR REDUCING WI-FI SCANNING USING CELLULAR NETWORK TO WI-FI ACCESS POINT MAPPING INFORMATION

PRIORITY CLAIM

This application claims the benefit of U.S. Provisional Patent Application Ser. No. 61/543,128, filed Oct. 4, 2011; and U.S. Provisional Patent Application Ser. No. 61/648,056, filed May 16, 2012; the disclosures of which are incorporated herein by reference in their entireties.

GOVERNMENT INTEREST

This invention was made with government support under Grant No. 0910868 awarded by the National Science Foundation. The U.S. Government has certain rights to this invention.

TECHNICAL FIELD

The subject matter described herein related to mobile communications networks. More particularly, the subject matter described herein relates to methods, systems, and computer readable media for reducing Wi-Fi scanning using cellular network to Wi-Fi access point mapping information.

BACKGROUND

Wi-Fi is considered to be one of the most important wireless data communication methods for mobile devices. In recent years, Wi-Fi has held higher importance in smart devices since it is being touted as the only alternative which can offload the deluge of mobile data rapidly saturating the capacity limit of cellular networks [4]. Several studies [5, 10] have stated that by the year 2014, up to 70% of the data generated by smart devices can be offloaded to Wi-Fi networks if the data to be offloaded can tolerate a certain amount of delay until the smart device moves into a Wi-Fi coverage area. Despite its capabilities, high energy consumption by Wi-Fi is a critical drawback in smart devices. According to [19], Wi-Fi consumes around 20% of the total power used by a smart phone even if the Wi-Fi radio is in idle state. Similarly, measurements indicate that web browsing through Wi-Fi consumes around 30% to 47% of power for various smart phones while the remaining significant portion of power is consumed by displays (LCD, OLED) and display back lights. The topic on energy savings for Wi-Fi has interested the research community for years, and, as a result, several different approaches to reduce the Wi-Fi power consumption have been proposed. These approaches include extending the duration of power saving mode (PSM), reducing the idle state listening power and removing the repeated triggering of Wi-Fi scans when the location is determined to have no Wi-Fi access point (AP).

Among many directions for saving Wi-Fi energy consumption, the subject matter described herein focuses on energy consumption in Wi-Fi scans. Given default operation triggering Wi-Fi scans whenever the display is turned on in most smart devices, energy consumption due to Wi-Fi scans is already non-trivial. However, the energy consumption due to Wi-Fi scans can become much more serious when use of cloud services by smart devices is considered. Cloud services, such as iCloud from Apple [1] attempts to synchronize data in a smart device with a remote server. Perfect synchronization requires that all synchronizations occur immediately whenever a change in data is detected, but this could severely burden cellular networks with data traffic. Hence, a viable solution will be to offload this synchronization burden to Wi-Fi networks [10]. For example, a video file recorded in a national park by the smart device can be synchronized to a cloud server whenever the device detects opportunities to connect to Wi-Fi networks while the user is returning back home so that he/she can watch the video through a TV connected to the cloud server. The question here is how to efficiently maximize the opportunities to offload data to Wi-Fi networks since continuous scanning of Wi-Fi APs is obviously not the best solution. A more interesting question can be how to maximally discover Wi-Fi APs with minimal power consumption. Given that the amount of power consumption of Wi-Fi during scan state is comparable to that of transmission state [19], this question appears to be challenging.

Accordingly, in light of these difficulties, there exists a need for methods, systems, and computer readable media for reducing Wi-Fi scanning using cellular network to Wi-Fi access point mapping information.

SUMMARY

The subject matter described herein includes methods, systems, and computer readable media for reducing Wi-Fi scanning using cellular network to Wi-Fi access point mapping information. In one exemplary method, a mobile communications device receives Wi-Fi and cellular signals and creates or obtains a database of mappings between Wi-Fi access points and cellular network information. The mobile communications device detects signals from base stations in the cellular network. The mobile communications device determines at least one recommended access point from the data derived from the database. The mobile communications device determines whether any Wi-Fi signals are present. In response to determining that at least one Wi-Fi signal is present, the mobile communications device attempts to connect to the at least one recommended access point.

As used herein, the term "cellular network" includes network technologies through which mobile communications devices, such as mobile telephones, smart phones, tablet computers, notebook computers, and laptop computers, access a network. The term "cellular network" is not limited to any particular generation of network access technologies and is intended to include, but not be limited to, 2G, 3G, 4G, and subsequent generation mobile communications device network access technologies.

The term "Wi-Fi" is intended to refer to network technologies through which devices access a network through a local access point. Examples of Wi-Fi access technologies include, but are not limited to, any of the IEEE 802.11 family of network access technologies.

The subject matter described herein for reducing Wi-Fi scanning using cellular network to Wi-Fi access point mapping information may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 1(a) illustrates the training phase, FIG. 1(b) illustrates the observation and matching phase, and FIG. 1(c) illustrates sequential connection and trials to recommended Wi-Fi access points;

In FIG. 2(a), the number is fluctuating from 1 to 7 (the maximum number of observations on current Android phones);

FIG. 16(a) illustrates temporal utilization showing that GAAS achieves similar performance to the naïve scheme with 60 second intervals while FIG. 16(b) illustrates that GAAS incurs comparable numbers of scans to the naïve scheme with 240 second intervals.

DETAILED DESCRIPTION

The subject matter described herein includes a Wi-Fi detection system, referred to as DirectWi-Fi, which utilizes cellular signal information (such as the set of observable base stations and the distribution of signal strengths) to statistically determine which Wi-Fi AP to connect to without the need for scanning all available channels and also to suppress scans when the area is determined to have no Wi-Fi AP. When DirectWi-Fi is running on a smart device, it first constructs a profile per Wi-Fi AP. The profile is defined to be the set of probability density functions (PDFs) of signal strengths from all observable base stations (BSs) when a Wi-Fi AP is connected. The set of observable BSs include the connected BS and neighboring BSs. DirectWi-Fi accumulates the cellular signal information and continuously updates the profiles. By the regularity of human movement patterns and their limited gyration characteristics [6], the profiles stabilize after accumulating the information for several days (referred to herein as the training period), unless the owner of the device travels to a different area.

After the training period, whenever a smart device wants to find a Wi-Fi AP, instead of performing full-channel scans, it captures few signal strength samples from all observable base stations instantly and determines the Wi-Fi AP most likely to be there by running the proposed likelihood estimator to the profiles. When there is no qualified Wi-Fi AP, DirectWi-Fi suppresses scans and Wi-Fi remains turned off. If there are multiple qualifiers, sequential attempts are made to connect to the qualifiers in order of likelihood. However, a full channel scan of all wireless access points is preferably suppressed. Each of the connection trials is only targeting a specific Wi-Fi AP so the energy consumption for each trial is much less than the general Wi-Fi connection after a scan. The overall procedures are illustrated in FIG. 1.

Figure 1:
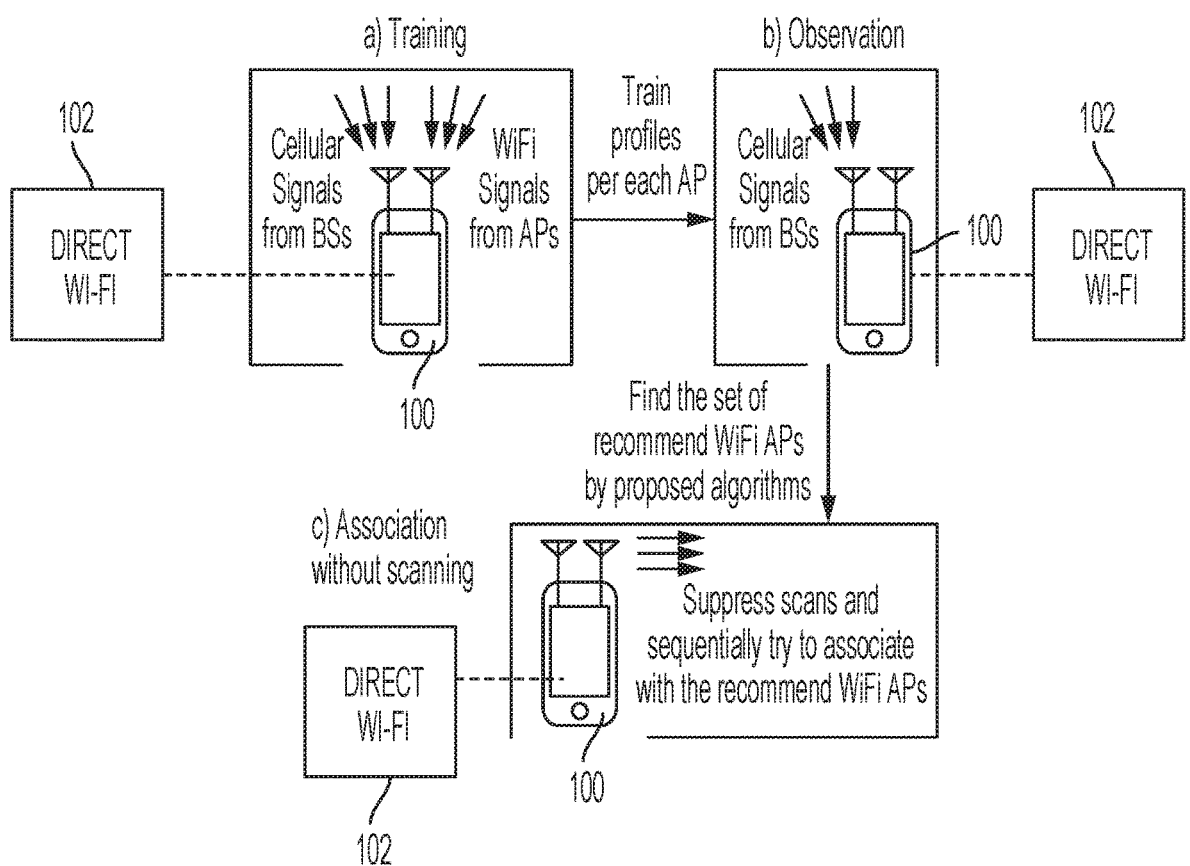
FIG. 1 is a network diagram illustrating direct Wi-Fi.

Referring to FIG. 1, Block A illustrates a training phase where wireless device 100 configured with direct Wi-Fi software 102 runs and stores correlations between base stations and wireless access points. In Block B, wireless device 100 configured with direct Wi-Fi software 102 receives signals from base stations and determines the set of recommended Wi-Fi access points that were determined during the training phase. In Block C, wireless device 100 configured with direct Wi-Fi software 102 suppresses scans and sequentially tries to connect or associate with the recommended Wi-Fi access points based on the observed signals from the base stations in Block B.

Through extensive trace-driven simulations over Wi-Fi and cellular signal logs from smart phone users, DirectWi-Fi is shown to connect to the Wi-Fi AP at about 1.3 connection trials and detects that there is no Wi-Fi AP at about 0.9 connection trials. This means that only 0.3 trials are wasted when there is indeed a Wi-Fi AP to connect to, and 0.9 trials are wasted when there is no Wi-Fi AP. Given that an exemplary trial method implemented on Android smart phones only consumes 70% less energy than the original Wi-Fi implementation when the connection is successful and about 90% less when the connection is not made, DirectWi-Fi extends about 11% of total battery time according to the evaluation over real Wi-Fi usage traces of smart phones which recorded the total number of Wi-Fi scans from the full battery charge to a complete drain.

The contributions of the subject matter described herein include the following:

We propose a system, DirectWi-Fi for smart devices, which infers the most probable Wi-Fi AP at the moment with the observations on the cellular signals from nearby base stations.

We propose a Wi-Fi AP matching algorithm for DirectWi-Fi which works well with short-term observation samples in identifying the most probable Wi-Fi AP from the long-term profiles.

We implement DirectWi-Fi on an Android smart phone and quantified the amount of energy saving through actual power consumption measurement and trace-driven emulations on daily smart phone usage traces.

We propose an adaptive scheduler adjusting the interval of DirectWi-Fi activation, which runs based on human mobility characteristics to minimize the energy in detecting Wi-Fi APs for offloading of persistent data from cloud services.

The rest of this document is organized as follows. Section 2 provides more details about related work. Section 3 provides observations made on cellular signals. Section 4 proposes a Wi-Fi AP matching algorithm that is based on the observations and its variants for comparison. Section 5 provides details on how a DirectWi-Fi scan operation is implemented as a background service in an Android smart phone. Performance of algorithms is evaluated through extensive trace-driven emulations in Section 5 and Section 6, respectively. Section 7 discusses remaining issues and Section 8 provides conclusions.

Section 2: Related Work

Reducing the Wi-Fi power consumption in smart phones has been an active area of research for several years. Many new techniques have been proposed to mitigate the excessive power consumption by Wi-Fi radios. Wake-on-Wireless [16] and E-Mili [20] focused on reducing the idle state power consumption of Wi-Fi since it consumes comparable power to that of the Wi-Fi transmission and reception. Recently, NAPman [15] and SleepWell [11] proposed intelligent idle period reduction schemes which enables Wi-Fi to stay in the power saving mode longer than original by estimating the exact moment to wake up the Wi-Fi radio so as to receive the data from a Wi-Fi AP.

Instead of reducing the duration of idle period in Wi-Fi, few other works concentrated on reducing the power consumption of Wi-Fi when in idle state. Shih et al. [16] proposed to install a secondary low frequency transceiver in a mobile device, which consumes extremely low power for idle listening and is capable of waking up the Wi-Fi whenever required. Xinyu et al. [20] proposed a method to downclock the Wi-Fi chipset when it is idle and then switch it back to the original clock immediately when it detects a packet to receive.

Research works that reduce the Wi-Fi scanning power have also been proposed. Kim et al. [7] proposed an adaptive scan algorithm leveraging the node velocity and the Wi-Fi AP density information based on their mathematical model. Footprint [19] inhibits unnecessary scan repetitions in a mobile device when there is no available Wi-Fi AP at a location until it detects a displacement of the device from the location. To detect the movement of a mobile device from a certain location, changes in received cellular signal information are observed. This idea is utilized in positioning assistance systems relying on GPS (Global Positioning System) and cellular signals [3, 8, 12, 13, 17, 18].

The present approach implemented in DirectWi-Fi is to leverage cellular signal strength information without the detailed coordination of base stations to efficiently save Wi-Fi scan energy. DirectWi-Fi proposes a likelihood estimation algorithm over cellular signal information and recommends an ordered list of Wi-Fi APs to sequentially connect to. The sequential connection implies directly connecting to a recommended Wi-Fi AP using a single channel scan without scanning all channels. Further, when there are no Wi-Fi APs to recommend, successive Wi-Fi scans are avoided. Given limited area of activity for humans [6, 9], DirectWi-Fi is effective for reducing energy consumption by scans in regular daily usage of Wi-Fi.

Section 3: Observation

Cellular communication technology is designed to provide ubiquitous access to and from a mobile device. Thus, smart devices carried by the users are overhearing signals from multiple cell towers all the time. In an urban area with denser cell tower deployment, it is possible for the devices to overhear signals from more than ten base stations.

In this section, a variety of statistical information pertaining to cellular signal information in smart phones is measured and three steps to investigate the feasibility of per-Wi-Fi AP profile construction from the cellular signal information are described. First, the number of cellular base stations (i.e., cell towers) that the phones can overhear is analyzed. Second, the signal strength distribution from a base station when the phone is connected to a specific Wi-Fi AP is analyzed. Third, the cellular signal statistics of two different Wi-Fi applications are compared and the possibility of distinction is assessed.

A monitoring application for Android was implemented to log information such as time, observable Wi-Fi APs and observable base stations and their signal strengths at regular intervals. The dataset used herein was obtained from the daily traces generated by five different student volunteers running the monitoring application over a period of 38 days. The volunteers were provided with Google Nexus One phones and they mainly moved around a university campus in a U.S. city. Through this experiment, about 900 hours of traces in total were collected.

Figure 2:
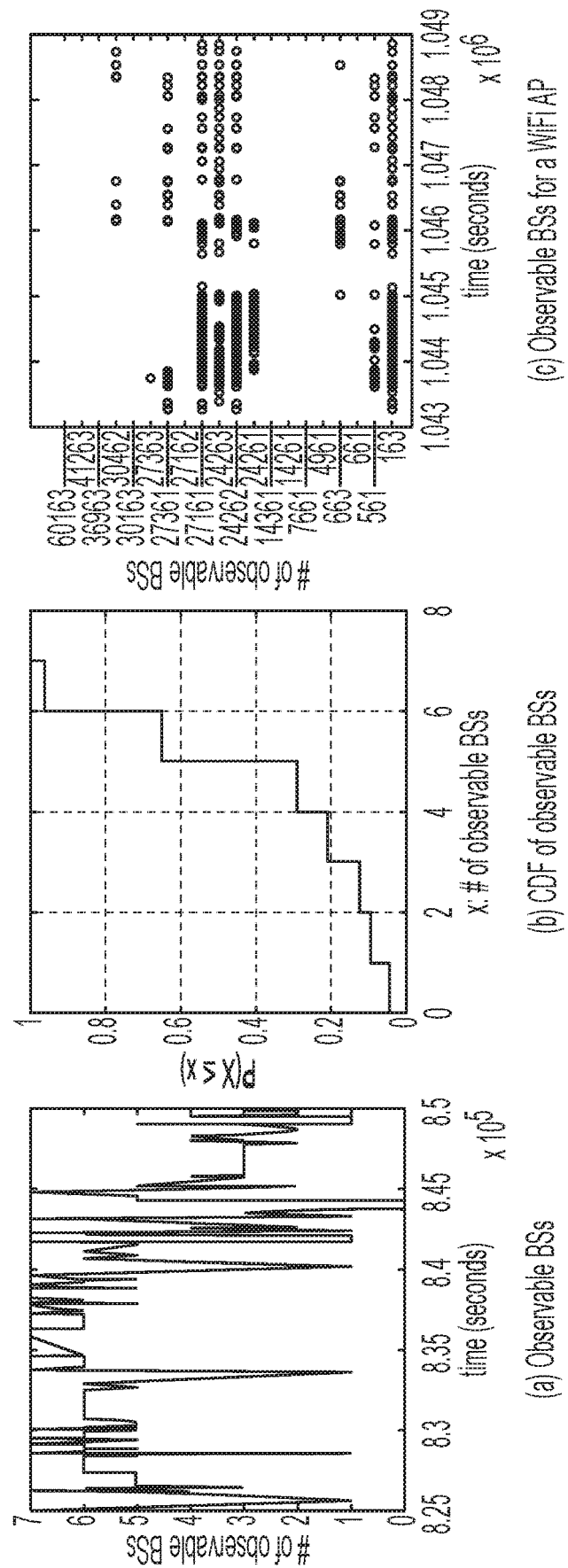
FIG. 2(a) is a graph illustrating a number of observable base stations over a period of 7 hours.
FIG. 2(b) is the cumulative distribution function of observed base stations.
FIG. 2(c) is a graph illustrating the number of base stations monitored for 100 minutes while the phone is connected to a specific Wi-Fi access point. During this period, the availability of base stations is marked using the circles. The y axis in FIG. 2(c) indicates the IDs of the base stations. It should be noted that some base stations are observable for longer periods of time or not observable during the time frame.

For a user in the experiment, it was noticed that the minimum number of observable base stations fluctuates from 1 (i.e., connected base station) to 7 over time as shown in FIG. 2(a). 7 is the maximum number of observable base stations implemented in Android OS. Given mobility of a user, it is natural to see that the number of observable base stations is highly varying over time due to their irregular deployment patterns. The cumulative density function (CDF) of the number of observable base stations of a user is shown in FIG. 2(b). If a user mainly lives around a megacity, the number will be more biased toward 7 and vice versa for a rural area. A more interesting observation is on the number of base stations for a specific Wi-Fi AP. FIG. 2(c) clearly shows that the number of base stations while a user is connected to a specific Wi-Fi AP changes over time because of two major factors: 1) small scale user mobility within the range of the Wi-Fi AP, 2) wireless channel fluctuation. However, it is also clear that several base stations that might be close enough are always there and they can serve as a hint of the logical location where the Wi-Fi AP exists.

Figure 3:
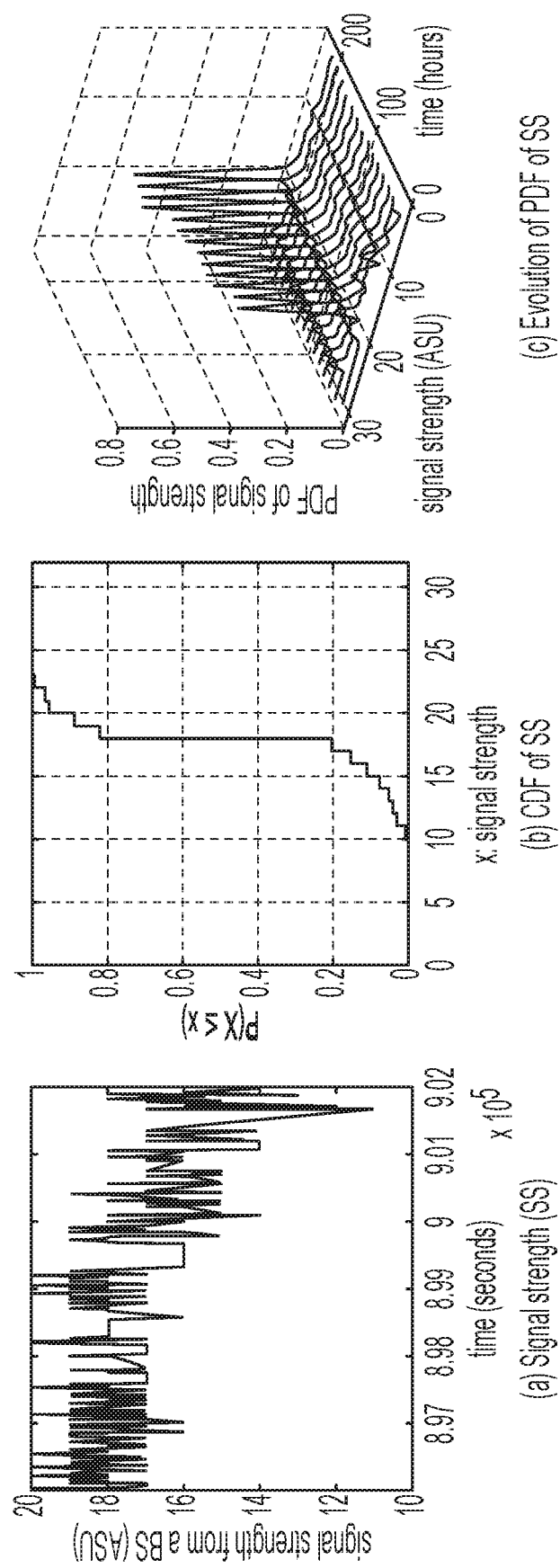
FIG. 3(a) is a graph of signal strength from a base station over time when a phone is connected to a Wi-Fi access point. Due to the correlation in the small time scale, the short average becomes different from the long term average.
FIG. 3(b) is the cumulative distribution function from a base station while a phone is connected to a Wi-Fi access point.
FIG. 3(c) is a graph illustrating the evolution of probability density functions of the accumulated signal strength over the amount of time x. After about 10 hours, the probability density functions become nearly stabilized.

Most of the localization research relying on a signal strength fingerprint compares the average signal strength value observed in a location to the average signal strength values obtained in many candidate locations to determine the best matching location. This intuitive method is not directly applicable to the subject matter described herein. As shown in FIGS. 3(a) and 3(b), the signal strength has only short-term correlation and severely fluctuates over time. Therefore, the average signal strength measured from only a few samples in a short time scale is infeasible to estimate the long term average signal strength. To overcome this, a statistically robust estimation method is presented below in the algorithm section.

If the signal strength is fluctuating, would the long term statistics eventually converge to a stable distribution? If the stability of the distribution is not visible, accumulating the long term statistics is not helpful in matching Wi-Fi APs. FIG. 3(c) shows the evolution of PDFs for a base station when a user is connected to a Wi-Fi AP. As FIG. 3(c) clearly shows, the PDF is mostly stabilized after about 10 hours and it can be used as a signature of the logical location where a Wi-Fi AP exists. The profile of a Wi-Fi AP is defined herein to be the set of PDFs of signal strengths of the base stations observed while the device is attached to a particular Wi-Fi AP. DirectWi-Fi running in a smart device updates these profiles for the Wi-Fi APs continuously.

Figure 4:
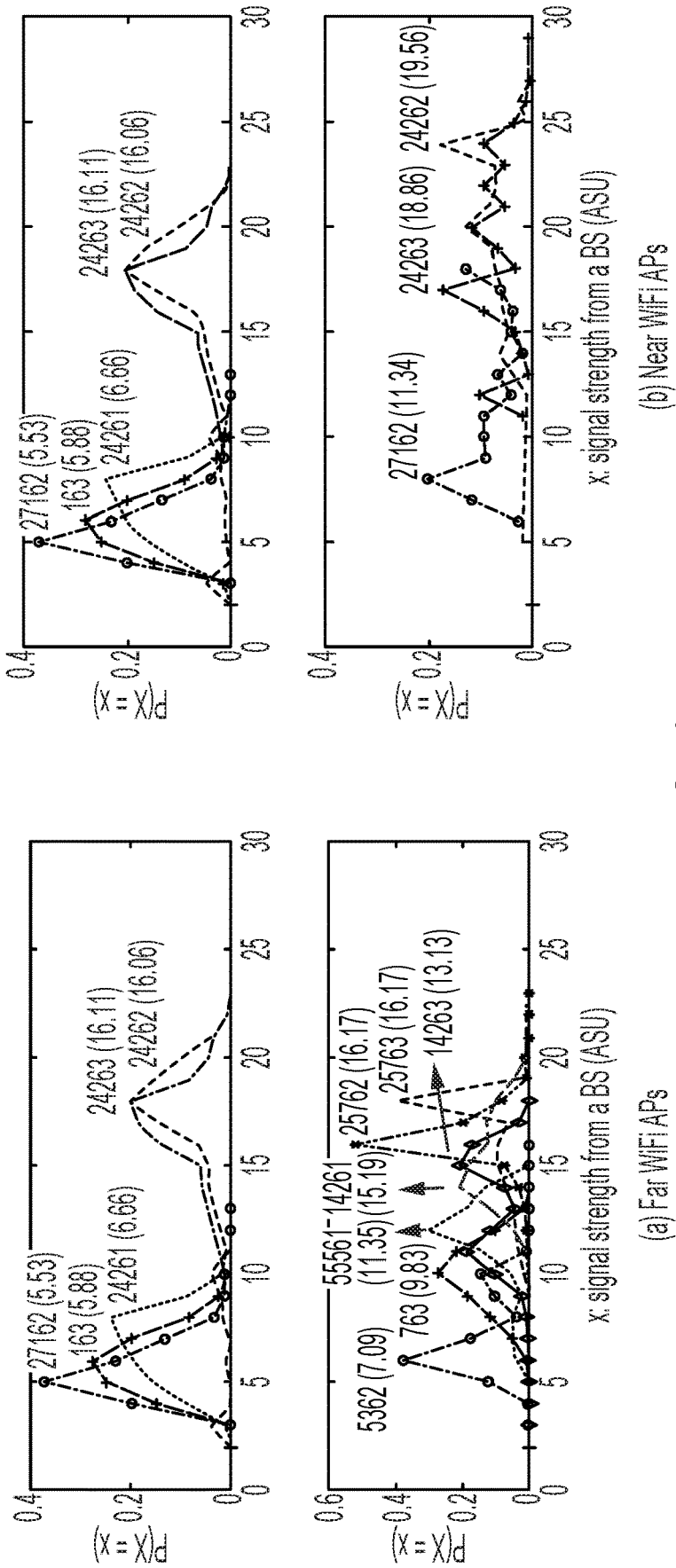
FIG. 4(a) is a graph of the base station profiles for two access points located at 6.9 kilometers in distance from the access points. The sets of base stations or profiles from the two base stations are different.
FIG. 4(b) illustrates base station profile for two access points located at 25 meters in distance from the same building. The observable base stations are similar but their profiles are different.

When two different Wi-Fi APs are located far from each other (e.g., home and office), it is clear that they have completely different sets of base stations observable in those locations. Also, the PDFs of signal strength from different sets of base stations will be different. In FIG. 4(a), the sets of base stations observable in two locations 6.9 kilometers apart is illustrated. In particular, the top graph in FIG. 4(a) illustrates the signal strengths of the base stations observable at one access point and the bottom graph in FIG. 4(a) illustrates the signal strengths of the bases stations observable at the other access point. It can be seen by comparing the top and bottom graphs that the access points have base station signal strength profiles that are distinguishable. Hence, the cellular information can easily assist a device to choose a Wi-Fi AP to connect to. However, when the APs are located closely (e.g., a Wi-Fi AP in a coffee shop and a Wi-Fi AP in a neighboring book store), is it still possible to single out the recommendation of a Wi-Fi AP? FIG. 4(b) shows base station profiles for two Wi-Fi APs located at 25 m in distance from each other. Comparing the top and bottom graphs in FIG. 4(b), it can be seen that the set of base stations observable at proximal access points is similar. However, the signal strength profiles of the base stations are different. The difference in signal strength profiles implies that likelihood estimation based on profile matching can have better resolution.

Section 4: Algorithms

In this section, an algorithm to find the best candidate Wi-Fi APs available from a database of profiles discussed earlier is presented. This section consists of two categories of algorithms, set based and signal strength based. Exemplary algorithms are presented in this section. Their experimental evaluation on energy savings are presented in Section 6.

Section 4.1: Set Based Algorithms

In the previous section, it was confirmed that two Wi-Fi APs located far from each other observe distinct sets of base stations. This observation motivates a naive algorithm which recommends a set of Wi-Fi APs such that the current observable base stations are included in the set of base stations recorded for the Wi-Fi AP. This naïve algorithm is referred to herein as BS Set Matching (BS-SET) and is formally described in Algorithm 1 set forth below where $B_o(i), B_o(i,a)$ and $A_o(i)$ denote the set of base stations observed at time slot i, the set of base stations observed when Wi-Fi AP a is observable at time slot i and the set of Wi-Fi APs observed at time slot i, respectively. Here, it is assumed that a mobile device takes sample readings from $t_1$ to $t_2$ and the long-term observations for Wi-Fi APs are made during a time period T starting from $t_0$. Note that I(•) denotes an indicator function which outputs 1 when the condition is true and 0 otherwise.

The BS-SET algorithm identifies the list of base stations and finds the best match to the sets of base stations observed under connections to different Wi-Fi APs. Hence, when the number of observed base stations ($|O(t_1, t_2)|$) becomes higher, the probability of having the correct Wi-Fi AP recommended as the first in the list (R) gets higher. However, BS-SET algorithm has a potential drawback in a rural scenario where a single base station covers a huge geographical area resulting in few observed base station even with a long observation duration (i.e., $[t_1, t_2]$).

---
Algorithm 1 BS-SET: BS Set Matching
---
Observed BSs, $O(t_1,t_2) := \{\cup B_o(i) | i = t_1, \ldots, t_2\}$
Observed APs, $R := \{\cup A_o(i) | i = t_0, \ldots, t_0 + T\}$
Set of BS for AP j, $P(j) := \{\cup B_o(i,j) | i = t_0, \ldots, t_0 + T\}$
BS Sets, $P := \{P(j) | j \in \cup A_o(i), i = t_0, \ldots, t_0 + T\}$
for $\forall j, j \in R$ do
   for $\forall k, k \in O(t_1,t_2)$ do
      $v(k,j) = I(k \in P(j))$
   end for
   $s(j) = \Sigma_{k \in O(t_1,t_2)} v(k,j)$
end for
Sort $j \in R$ by the descending order of $s(j)$
Recommend the sorted R
---

---
Algorithm 2 BS-WGT: Weighted BS Set Matching
---
Given $O(t_1,t_2), P, R$,
for $\forall j, j \in R$ do
   for $\forall k, k \in O(t_1,t_2)$ do
      $v(k,j) = \Sigma_{i=t_0}^{t_0+T} I(k \in B_o(i,j))$
   end for
   $s(j) = \Sigma_{k \in o(t_1,t_2)} v(k,j)$
end for
Sort $j \in R$ by the descending order of $s(j)$
Recommend the sorted R
---

The BS-SET algorithm can be slightly improved by considering the importance of observed base stations as weights. Weighted BS Set Matching (BS-WGT) additionally considers the number of occurrences of observing a specific base station for the Wi-Fi APs included in R. This is helpful in filtering out the bias from base stations which are rarely observed during the long-term history due to unstable and poor signals. The weight for a base station k within the range of a Wi-Fi AP j is denoted by $v(k,j)$ and the total weight for the base stations included in the observed list $O(t_1, t_2)$ becomes $s(j)$ as described in Algorithm 2. BS-WGT algorithm suggests a Wi-Fi AP recommendation list in the descending order of their $s(j)$ values.

Section 4.2: Signal Strength Based Algorithms

The recommendations provided by the above two algorithms can be further refined if the statistics of signal strength from base stations are considered. As stated in Section 3, the profiles can be utilized to design a likelihood function which is statistically more robust than the aforementioned algorithms as well as the existing algorithms relying on average signal strengths similarity. To realize this, the probability of observing a sequence of signal strengths from a base station given their long-term PDFs included in the profiles is derived.

Here is a quick example. Suppose that a mobile device has sampled 5 signal strength values from a base station, $s_1, s_2, s_3, s_4, s_5$ and the long-term PDFs of the base stations constructed for two different Wi-Fi APs are $f_1(s)$ and $f_2(S)$. Then, the probabilities of observing $s_i$, $i=1, \ldots, 5$ in two PDFs are $$(\Pi_{i=1}^{5} f_1(S = s_i))^{\frac{1}{5}} \text{ and } (\Pi_{i=1}^{5} f_2(S = s_i))^{\frac{1}{5}},$$

respectively. Here, larger probability values for a PDF indicate that the sequence of signal strength values is more likely to be observed within that PDF. As the sequence gets longer, this probability based approach becomes more accurate. When the profiles of several Wi-Fi APs closely resemble each other, there may arise a situation where it becomes impossible to prioritize between the Wi-Fi APs. In such situations, the algorithm prefers the Wi-Fi APs with longer total stay durations.

Detailed working of Signal Strength Distribution Matching (SS-PDF) is given in Algorithm 3. As it is described, SS-PDF algorithm utilizes profiles consisting of sets of base stations P and signal strength distributions $f(S)$. Some advantages of the SS-PDF algorithm comes from the likelihood function $v(k,j)$ and $s(j)$ which denote the probability of observing a sample signal strength sequence from a bast station k when connected to a Wi-Fi AP j and the probability of total observation on the set of base stations and their signal strength samples when connected to a Wi-Fi AP j. The multiplication of probabilities can be practically replaced by a sum of log values in an implementation. The computation complexity of SS-PDF is not significantly increased from aforementioned algorithms but utilizes much detailed information resulting in substantial performance (i.e., prediction accuracy) improvement which will be shown in Section 6. For comparison, we additionally provide the description of a widely used Average Signal Strength Matching (SS-AVG) algorithm in Algorithm 4. Note that SS-AVG algorithm takes the average signal strengths from the observed base stations (e.g., $\Sigma_{i=1}^{5} s_i/5$) and recommends Wi-Fi APs in the ascending order of mean square error, $s(j)$. Intuitively, SS-AVG can work well with long samples (i.e., large $O(t_1, t_2)$) which can provide statistically unbiased average value however its performance is not guaranteed under a more practical situation using a short sampling duration.

---
Algorithm 3 SS-PDF: Signal Strength Distribution Matching
---
Given $O(t_1, t_2), P, R$,
Observed Signal Strength from BS k, $s_i(k)$ where $k \in O(t_1, t_2)$, $i = t_1, \ldots, t_2$
Long-term PDFs of Signal Strength for AP j, $f_{k,j}(S)$ where $k \in P(j)$
for $\forall j, \in R$ do
   for $\forall k, k \in P(j)$ do
      if $k \in O(t_1, t_2)$ then $$v(k, j) = \left(\prod_{i=t_1}^{t_2} f_{k,j}(S = s_i(k))\right)^{\frac{1}{|O(t_1,t_2)|}}$$

else
         virtual signal strength for all i, $s_i(k) = -1$
         $v(k, j) = \Pi_{i=t_1}^{t_2} f_{k,j}(S = s_i(k))$
      end if
   end for
   $s(j) = (\Pi_{k \in P(j)} v(k, j))^{1/|P(j)|}$
   Stay time, $t(j)$ for tie break
   $t(j) = \Sigma_{i=t_0}^{t_0+T} I(B_o(i, z) \neq \emptyset)$
end for
Sort $j \in R$ by the descending order of $s(j)$
When there are js of the same $s(j)$, use $t(j)$ for tie break.
Recommend the sorted R
---

---
Algorithm 4 SS-AVG: Average Signal Strength Matching
---

Given $O(t_1,t_2)$,P,R,
Observed Average Signal Strength from BS k, m(k) where
$k \in O(t_1,t_2)$
Long-term Average Signal Strength for AP j, m(k,j) where $k \in P(j)$
for $\forall j, \in R$ do
   for $\forall k, k \in O(t_1,t_2)$ do
     v(k,j) = |m(k) − m(k,j)|
   end for
   $s(j) = (\Sigma_{k \in o(t_1,t_2)} v(k,j)^2)^{1/2}$
end for
Sort $j \in R$ by the ascending order of s(j)
Recommend the sorted R

---

Section 5: Implementation

Figure 5:
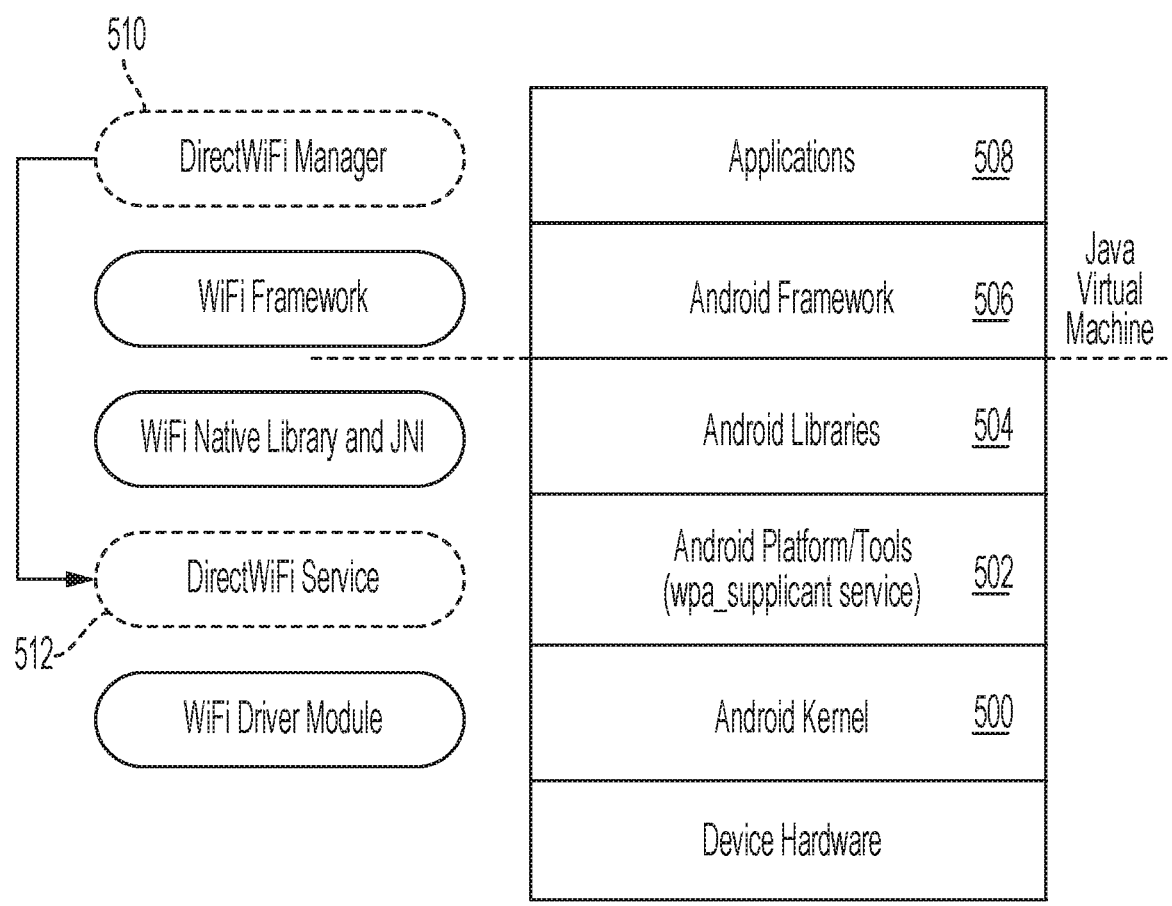
FIG. 5 is a block diagram illustrating an exemplary software architecture for Android phones and a DirectWi-Fi manager and a DirectWi-Fi service according to an embodiment of the subject matter described herein.

In this section, the implementation details of implementing DirectWi-Fi on an Android-operated Google Nexus One smart phone are described. As discussed above, DirectWi-Fi aims at eliminating scans and associating directly with the recommended Wi-Fi APs through the algorithms proposed herein. To realize this in a smart phone, two modules are implemented; Direct Wi-Fi Manager at the application layer and Direct Wi-Fi Service in the existing wpa_supplicant back-end daemon service which sits at the platform layer. As shown in FIG. 5, the Android software stack can be thought of having a Linux Kernel 500, Platform/Tools 502, Core Android Libraries 504, Android Application Framework 506 and the Applications 508 sitting at the top of its architecture. Hence, DirectWi-Fi can be considered to be implemented in both middle and top layers of Android Stack. From a functional point of view, DirectWi-Fi manager 510 constructs the profiles for all observable Wi-Fi APs using cellular signal strength information through a training period and determines the recommended set of Wi-Fi APs to deliver them to the back-end daemon service whenever the device needs network connectivity. DirectWi-Fi service 512 in the wpa_supplicant makes the device to sequentially associate with the Wi-Fi APs from the recommendation set. The communication between DirectWi-Fi manager 510 and DirectWi-Fi service 512 is enabled via a configuration file wpa_supplicant.conf which is accessible at runtime to both DirectWi-Fi manager 510 and DirectWi-Fi service 512 by read/write operations and a socket communication interface respectively. To associate with a particular Wi-Fi AP, DirectWi-Fi service 512 performs a single channel scan which actively scans for a particular frequency channel to which the given SSID belongs and obtains all necessary driver state information to connect with the Wi-Fi AP. Furthermore, it is possible to implement a service with zero scan by remembering detailed state information about Wi-Fi APs such as SSID, MAC address, channel information and authentication credentials but it involves a complete redesign of the supplicant module which is more of a developmental issue. Through the use of a digital power monitor; the ability of the present implementation to actively scan a particular channel for a SSID rather than to scan the entire set of channels for association, resulted in a significant reduction in the energy consumption of Wi-Fi. More details are discussed in Section 6.

Figure 6:
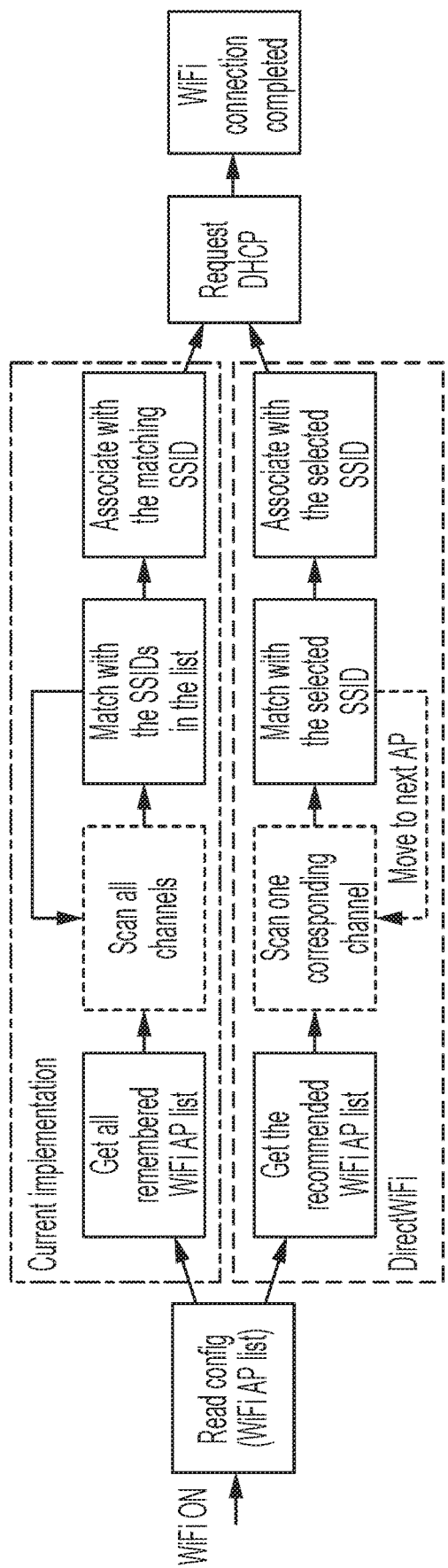
FIG. 6 is a state diagram for DirectWi-Fi and a current Wi-Fi implementation for Android phones.

For better understanding of the operations of DirectWi-Fi, simplified state diagrams of the current implementation of Wi-Fi in an Android phone and the DirectWi-Fi implementation are provided, describing procedures from the wake up of Wi-Fi radio to the completion of network connectivity. As shown in FIG. 6, the current implementation of Wi-Fi in an Android phone starts from reading the configuration file wpa_supplicant.conf which contains the remembered Wi-Fi APs and populates the data to the back-end daemon service. Then, the Wi-Fi driver module is initialized and a scan is initiated to scan all available channels. After obtaining the scan results from the Wi-Fi driver, the scan results are tested to match with the SSIDs obtained from the configuration file in the order of recommendation. Once a matching SSID is found, a request to associate with the selected SSID is made to the Wi-Fi driver. When an association is successfully completed, a DHCP request is made to obtain the IP address. Finally, once an IP address is assigned by DHCP, the device is connected to the wireless network. It is important to note that in the current implementation, the scan requests are continuously generated until the device is successfully connected to the network or until a connection timeout happens in the driver. Thus, when a device is placed in a location with no Wi-Fi AP, the scans continuously drain energy of the device. This is a well known problem [19] solved efficiently by DirectWi-Fi.

The implementation of DirectWi-Fi also starts with reading the configuration file. But the configuration file for DirectWi-Fi is being updated by DirectWi-Fi manager 510 and the recommend Wi-Fi APs along with their channels are listed with top priorities. Once the file is read, DirectWi-Fi sequentially selects a Wi-Fi AP from the top of the list and actively scans for a single channel to which the Wi-Fi AP belongs. Because of the single channel scan, the amount of time taken by the Wi-Fi driver to complete the scan is significantly reduced. This finally contributes the reduction of association time to a Wi-Fi AP. When a request to associate fails, the Wi-Fi AP next in the priority list is selected and the process is repeated till the end of the recommendation list. According to the evaluation presented in Section 6, the average number of trials to make a successful connection is about 1.3. When a user moves to a new location in which the recommended Wi-Fi APs are different, DirectWi-Fi manager 510 asynchronously updates the configuration file. Then, the Android platform automatically provides a signal to the DirectWi-Fi service 512 to load a new Wi-Fi AP recommended in the configuration file. Note that DirectWi-Fi manager 510 suppresses trials to connect to Wi-Fi APs whose outcomes of the algorithms are below a certain threshold. In Section 6, it is illustrated that all of the unnecessary scans in a location with no Wi-Fi APs can be efficiently suppressed.

Section 6: Evaluation

In this section, energy consumption measurements between the general Wi-Fi implementation and the DirectWi-Fi implementation on a Google Nexus One Android smart phone using a digital power monitoring device, Monsoon [2] are compared. Then, the percentage of energy savings that can be achieved by DirectWi-Fi through use of extensive trace-driven simulations on a dataset containing over 30 days of recorded smart phone Wi-Fi usage logs is investigated.

Section 6.1: Energy Consumption Measurement

Figure 7:
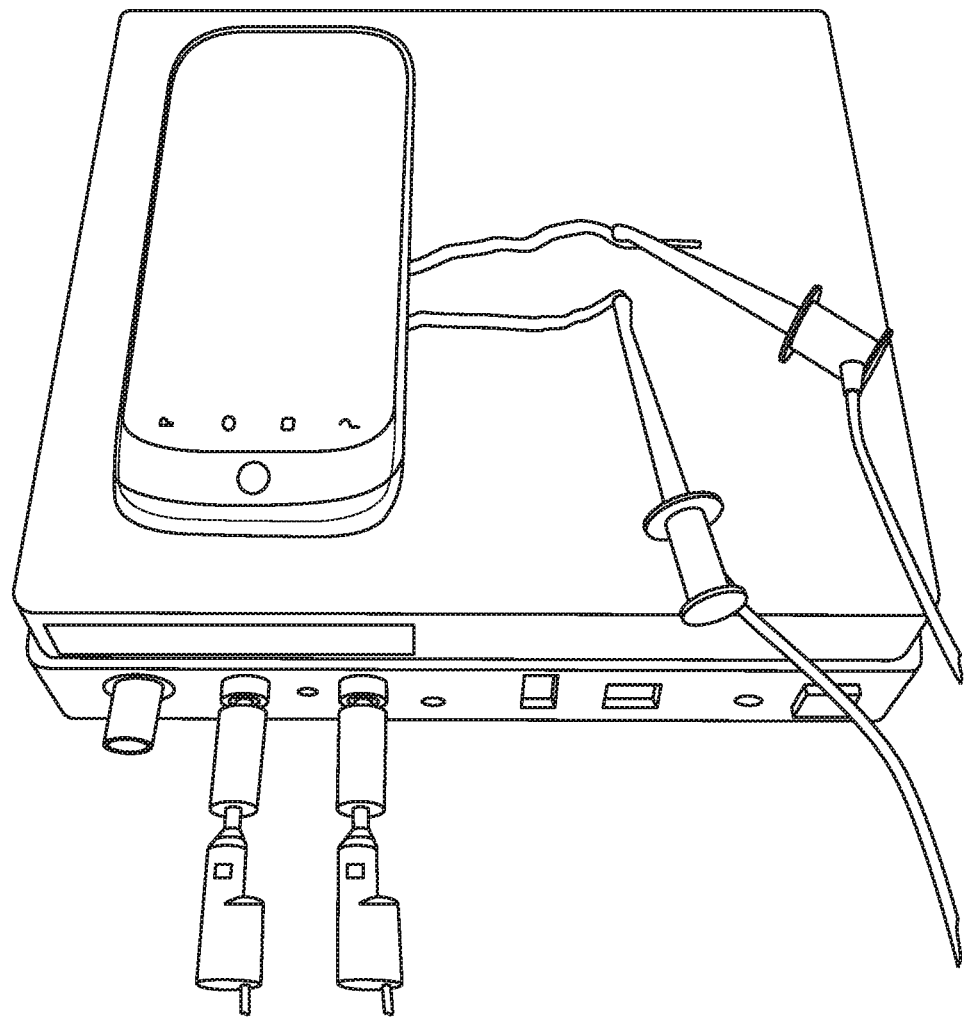
FIG. 7 is an image illustrating a power meter from Monsoon Solutions measuring power consumption of an Android implementation of direct Wi-Fi for Nexus One. The measurement data is transferred to a computer connected by USB for display and can be exported to a file for further analysis.

To quantify the impact of DirectWi-Fi in energy saving, detailed power consumption for both the implementations was measured. A power meter was used to directly supply the power to the phone and measure the power consumed through a PC connected through USB as shown in FIG. 7. The device was configured to sample the amount of power consumption every 200/AS which is the highest granularity of the device. The power graph fluctuates continuously, even for simple operations on a smart phone. To isolate the power consumed by Wi-Fi, all other sensors on the phones were deactivated, all applications were closed, and the phone was placed in standby mode. Wi-Fi was then activated in the phone and the power consumption was measured until the phone connects to a Wi-Fi AP. As shown in the topmost graph in FIG. 8(a), the current implementation of Wi-Fi in Android phones does a passive scan for all SSIDs in all the channels. It listens for 3 continuous beacon intervals each of which are 100 ms long in every channel and then moves on to next channel. Thus the amount of energy spent in scanning all channels is high. Once after the scan results are available, an Wi-Fi AP Selection Process is done where the scan results are matched with SSID names in the configuration list. Here, many priority criteria such as WPA-enabled AP, non-blacklisted AP, matching SSID and etc. are considered for Wi-Fi AP selection. If a suitable candidate is not found, the same process is repeated to find a non-WPA-enabled Wi-Fi AP. Thus, the time taken to start the association process with a particular Wi-Fi AP is high. In DirectWi-Fi implementation, since a single channel is probed for a specific Wi-Fi AP, the time taken to scan and subsequently to start the association is reduced. This reduces the amount of time the Wi-Fi radio is in high power mode. DirectWi-Fi service may run continuously in the phone background to read changes in GSM signal strengths, the amount of power consumed by the service is measured. The average amount of power consumed by DirectWi-Fi running in the background is shown to be around 3 mW which is very minimal.

Section 6.2: Trace-driven Performance Evaluation

Figure 9:
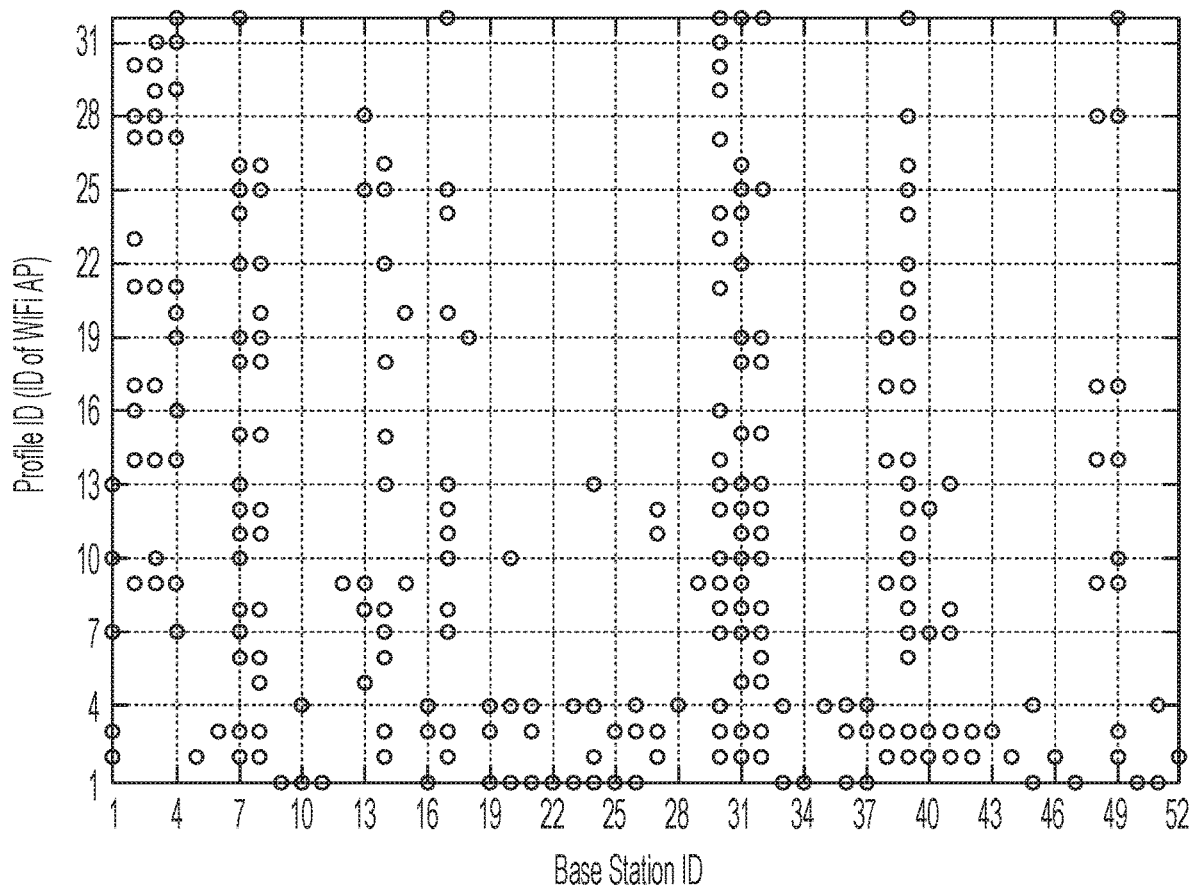
FIG. 9 is a graph illustrating profiles for 32 Wi-Fi access points observed during over 20 daily traces for different base station IDs mapped to each profile. In total, 52 base stations are detected (ID is replaced by sequential numbers for better illustration)
Figure 10:
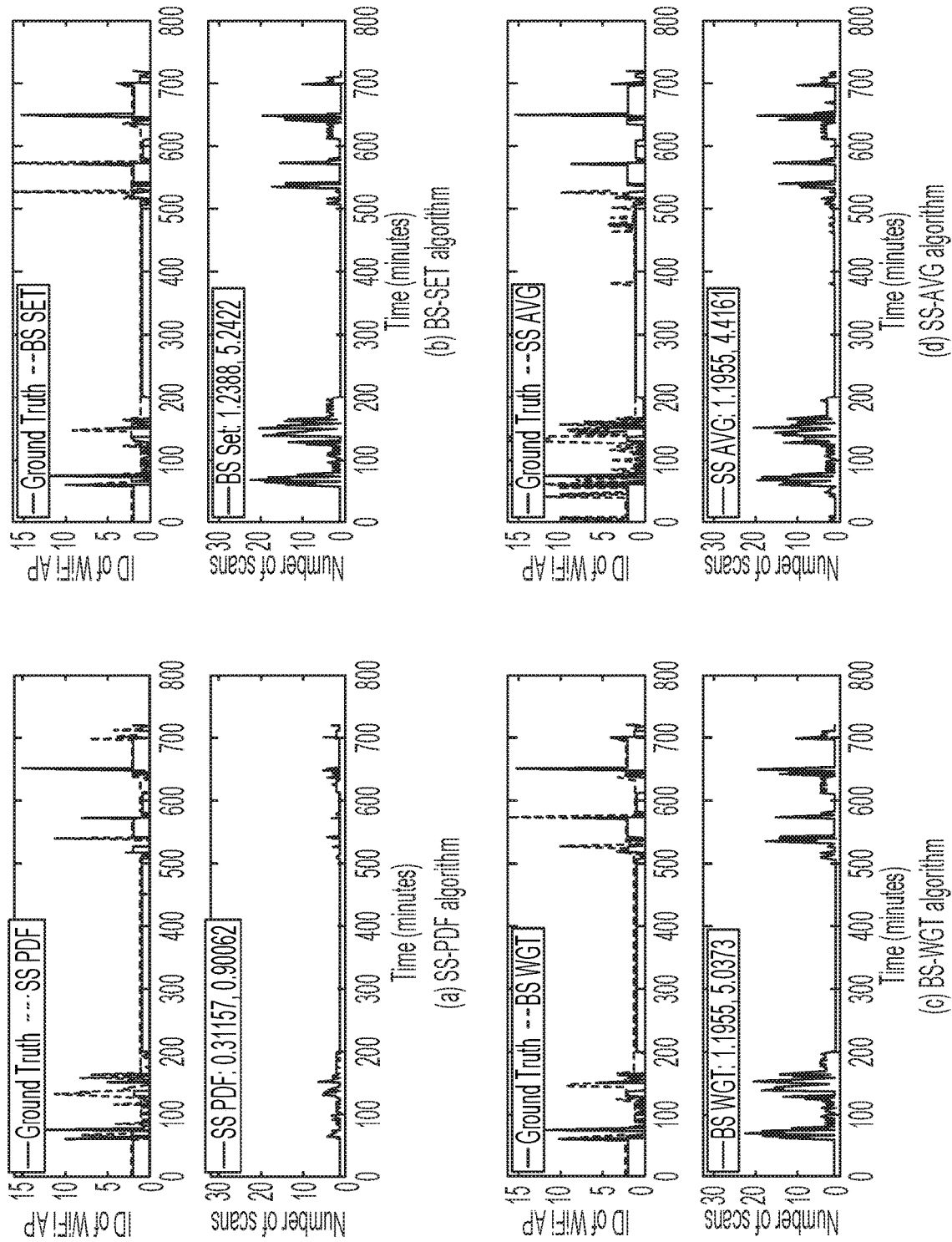
In FIG. 10, each upper graph illustrates Wi-Fi access point of the ground truth versus the most probable Wi-Fi access point recommended by the algorithms (A) SS PDF (B) BS SET (C) BS WGT and (D) SS AVG, when they sample 60 seconds of base station and their signal strength information. The lower graphs in FIGS. 10(a) through 10(d) illustrate the order of correct Wi-Fi access points in the recommended set. The values in the legend denote the average number of wasted scans under Wi-Fi access point and no Wi-Fi access point.

The performance of DirectWi-Fi with SS-PDF algorithm is compared to other three algorithms shown in Section 4 through trace-driven emulations over our traces. The algorithms described above are applied to the profiles to quantify how accurately the algorithms find out the Wi-Fi AP available at the moment. For the traces tested, the set of observable base station IDs in each profile is depicted in FIG. 9. As the algorithms described herein provide most probable Wi-Fi APs sorted by their likelihood, we can easily quantify the order of the ground truth Wi-Fi AP in the given list. The smaller average order means better estimation performance. For example, given that there is a Wi-Fi AP to connect as the ground truth, the average order of 1.3 means that an algorithm performs 1.3 scan trials on average and wasted 0.3 scan trials before getting connected to the correct Wi-Fi AP. (Note that a scan trial implies a single channel scan.) Similarly, given that there is no Wi-Fi AP, the average order of 2.5 means that 1.5 scan trials are wasted until the decision not to scan further is made. (Note that the ground truth is that there is no Wi-Fi AP.)

FIGS. 10(a)-10(d) show the performance of 4 algorithms, a) SS-PDF b) BS-SET c) BS-WGT d) SS-AVG in detail. For FIG. 10, the algorithm outputs an answer every 1 minute for 12 hours of a day based on the base stations and their signal strength information collected for the most recent 60 seconds. The upper graph in each of FIGS. 10(a)-10(d) shows the connected Wi-Fi AP ID in the ground truth (solid line) for 12 hours and the most probable Wi-Fi AP ID predicted by an algorithm (dotted line). The Wi-Fi AP ID of zero means there was no available Wi-Fi AP at the moment. The lower graph in each figure shows the order of the ground truth Wi-Fi AP in the sorted list generated by an algorithm. The average numbers of wasted scans when there is Wi-Fi AP and when there is no Wi-Fi AP are given as legend in FIG. 10. According to the results, SS-PDF algorithm wastes very few scan trials even with small number of signal samples (i.e., 60 seconds) and it outperforms other three algorithms.

Figure 11:
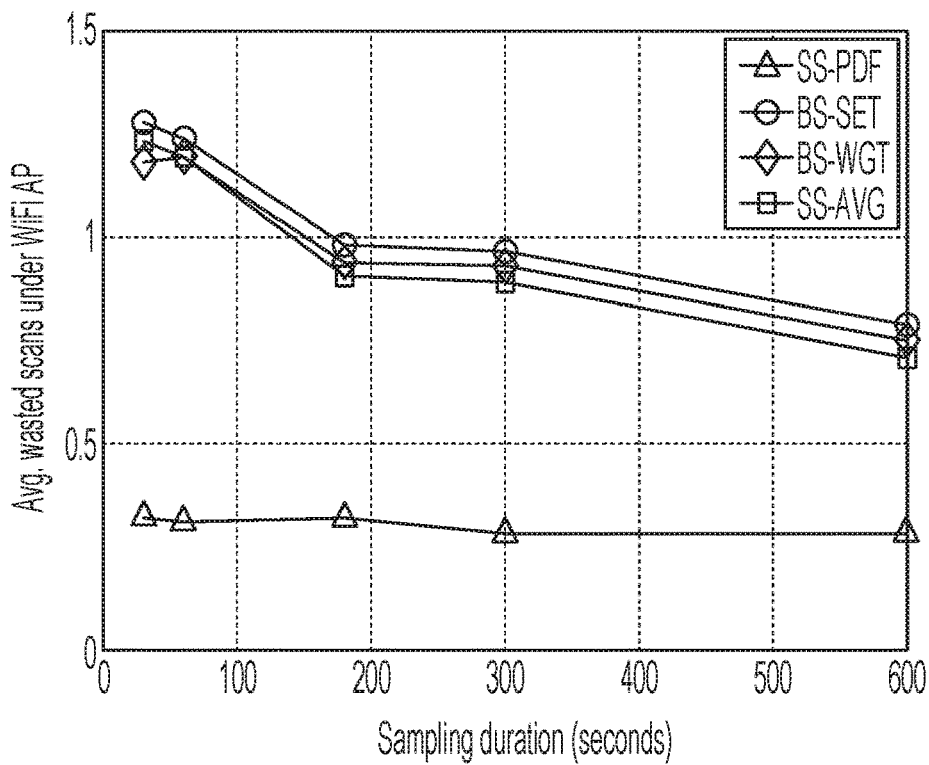
FIGS. 11(a) and 11(b) illustrate average wasted scans under Wi-Fi access point and under no Wi-Fi access point for 4 different algorithms in varying sample durations from 30 seconds to 600 seconds.
Figure 11:
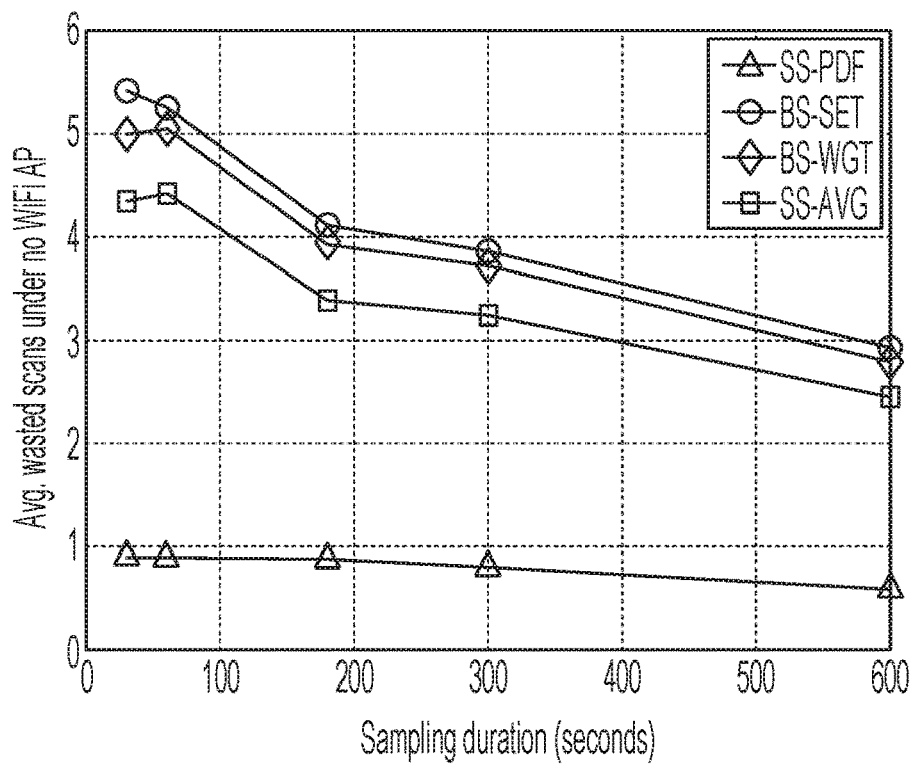
Figure 12:
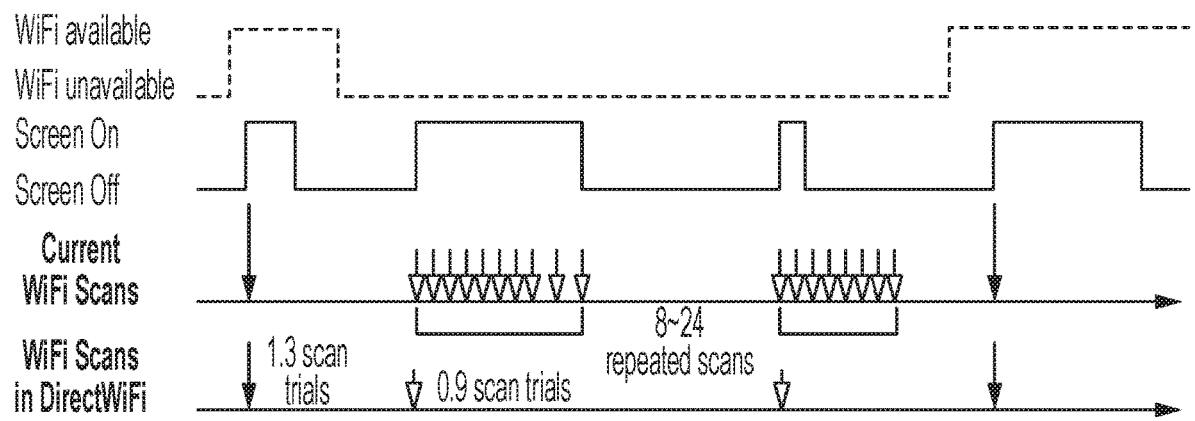
FIG. 12 is a graph illustrating Wi-Fi scan operations and DirectWi-Fi in current Android implementations. A scan is automatically initiated when a user turns on the mobile device. When there is an available Wi-Fi access point, the connection is made by scan in DHCP operation followed by the scan. When the scan fails to find a Wi-Fi access point to be connected, scans are repeatedly performed every 15 seconds for the first two minutes and every 30 seconds for up to ten minutes (consequently 8-24 scans). The black arrow and the white arrow in FIG. 12 illustrate scans performed when Wi-Fi access points are available and unavailable. The lengths of the arrows show the relative amount of energy consumption.

FIGS. 11(a) and 11(b) further test the algorithms for various sampling periods from 30 seconds to 600 seconds. In all sampling ranges, SS-PDF outperforms others but the performance gap becomes less by the nature of other algorithms. This result addresses that DirectWi-Fi works best with SS-PDF algorithm, however BS-SET or BS-WGT can be adopted for minimal computation overhead if it is allowed to have a large amount of samples for prediction.

In the following subsection, we quantify the energy saving through DirectWi-Fi by combining the results introduced above.

Section 6.3: Energy Saving Through DirectWi-Fi

The amount of energy saving through DirectWi-Fi is quantified by combining the results from energy measurements, trace-driven emulation and real traces. The number of Wi-Fi scans for 3 different Android phone users during their daily usage was first measured. On an average, the total number of Wi-Fi scans performed in an Android phone ranged from around 300 to 400 scans for one full battery discharge cycle (about one day). For normal daily usage, almost 48% of the scans performed are wasted because of the absence of a Wi-Fi AP nearby and the remaining 52% of the scans performed occur in the presence of a Wi-Fi AP.

Figure 8:
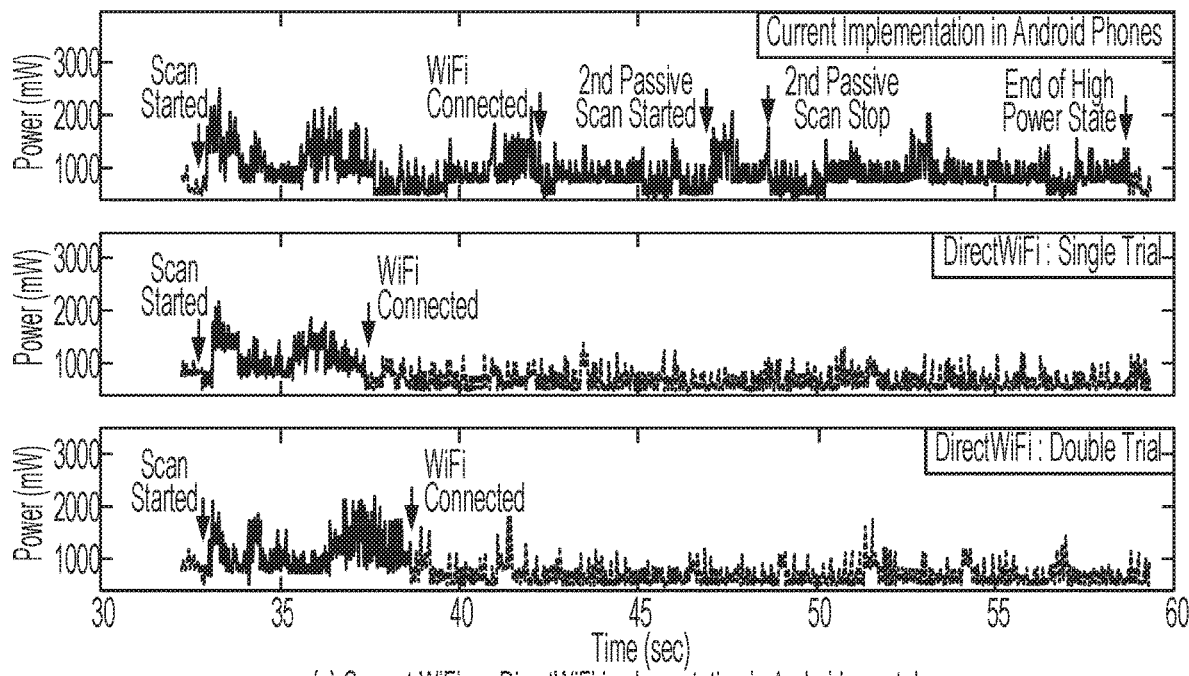
FIG. 8(a) is a graph illustrating power consumption measurements of current Wi-Fi implementations in Android phones and DirectWi-Fi implementation from the start of a scan until the connection to a Wi-Fi access point. The data is sampled every 200 microseconds by the Monsoon device. DirectWi-Fi saves about 41% energy and a connection was completed 32% faster.
FIG. 8(b) is a chart comparing the difference in energy consumption with position of the recommended access point in the list.
Figure 8:
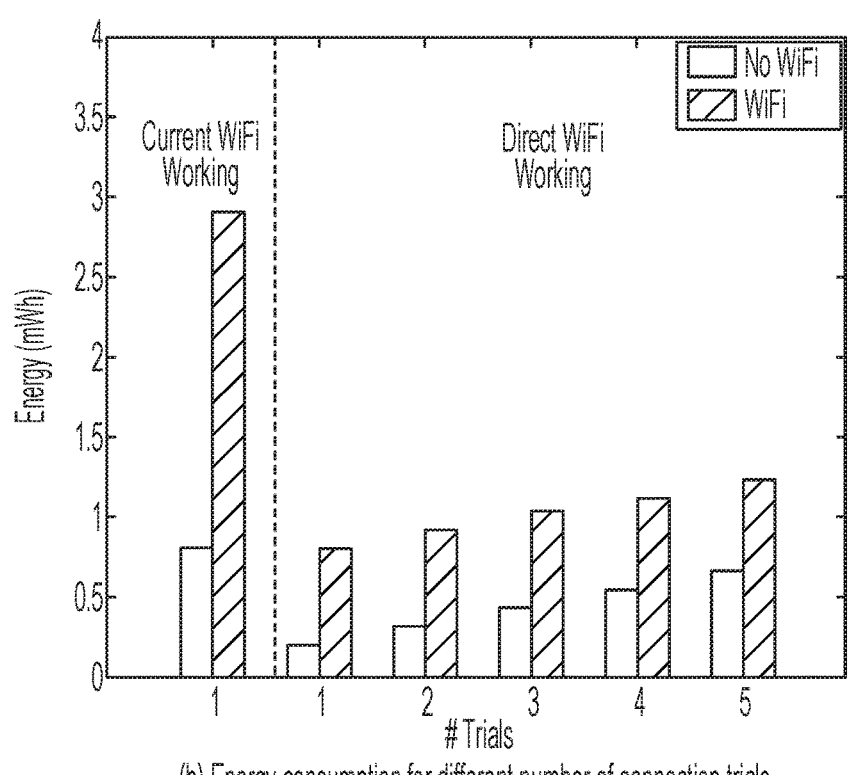

Next, the amount of energy spent by Wi-Fi scanning under Wi-Fi and no Wi-Fi scenarios is presented in FIG. 8(b). Per each scan, DirectWi-Fi spends from 0.788 mWh if it gets associated to a Wi-Fi AP in the first trial to around 1.230 mWh if it gets attached in the fifth trial whereas current implementation of Wi-Fi spends around 2.882 mWh to attach to an AP. Given the performance of DirectWi-Fi with SS-PDF algorithm in FIG. 10(a), DirectWi-Fi is expected to consume around 0.826 mWh as it succeeds in 1.31 trials on average. Similarly, under no Wi-Fi AP, DirectWi-Fi is expected to consume around 0.170 mWh as it suppresses scans after 0.9 trials on average while current implementation consumes 0.799 mWh per each scan. Hence the total energy consumption for DirectWi-Fi amounts to 146.367 mWh which is the sum of the individual energies consumed under Wi-Fi and no Wi-Fi scenarios for one full battery discharge cycle. This indicates that around 74.91% of energy for Wi-Fi scans is saved by using DirectWi-Fi considering that 583.329 mWh is consumed in current implementation.

To conclude the energy saving of DirectWi-Fi, the energy consumption due to cellular signal overhearing is added. The additional power consumption due to the cellular signal overhearing is around 2.612 mW. Hence, if we assume that the overhearing is performed all the time for one full battery discharge (typically around 24 hours), the additional energy consumption is expected to be around 62.688 mWh. Now, the final values are presented and it is concluded that DirectWi-Fi has an ability to save about 436.962 mWh for a full battery discharge and this corresponds to about 8.43% of the total battery capacity, 4440 mWh (3.7 V×1200 mAh) in Nexus one. The values provided above belong to the lowest observed Wi-Fi scan count of 310 during our test trials. When we consider the highest observed Wi-Fi scan count of 400, the maximum energy saving attained by DirectWi-Fi amounts to 544.645 mWh which is 10.85% of the total battery capacity. This corresponds to about 8 to 11% increase in the battery time. This increase in battery time may increase or decrease depending on the Wi-Fi usage pattern for different types of users.

The increase in the battery time is achievable given that the amount of power consumed by Wi-Fi radio as measured in Table 12 for a Google Nexus One smart phone which shows that Wi-Fi consumes around 14 to 18% when it is idle and around 30 to 47% when it is actively used.

Section 7: Discussion

In this section, two other techniques which can further improve the performance of DirectWi-Fi in practical scenarios are discussed. The first technique is the adaptive activation scheduling of DirectWi-Fi for reducing computation overhead. The second technique is a profile sharing system to enable smart phone users with same device model to share Wi-Fi profiles with each other. Each of these techniques is described in detail below.

Section 7.1: GAAS: Graph-based Adaptive Activation Scheduling

In addition to the performance improvements gained in battery capacity using DirectWi-Fi, it can be successfully leveraged to offload delay tolerant data traffic from cellular networks to Wi-Fi networks. This mode of usage aims to maximize detection of available Wi-Fi AP at minimal energy cost. The cloud services such as iCloud can be the best application scenarios as they would burden the cellular network by triggering persistent synchronization of local data to cloud servers in absence of an efficient offloading method.

Intuitively, capturing Wi-Fi connection opportunities without a single miss can be achieved by scanning Wi-Fi APs regularly with a minimum scanning interval (e.g., 1 second). DirectWi-Fi has proved performance improvements even for this naive scanning approach by suppressing the scans when the vicinity is determined to have no Wi-Fi AP. However, persistent computation of DirectWi-Fi is required to enable this, which is not desired. A Graph-based Adaptive Activation Scheduling (GAAS) scheme for invoking DirectWi-Fi computations in a more intelligent manner is proposed. The GAAS scheme leverages on regularity in human mobility to estimate connectivity durations with various Wi-Fi APs and time intervals when not to expect any Wi-Fi connection.

Scheduling parameters for GAAS can be estimated in four steps. First, it builds a graph with the set of vertices V representing Wi-Fi APs which had been connected by a smart device during its training period and the set of directed edges E including cyclic edges representing the migration of connections among Wi-Fi APs. Second, GAAS assigns weights, w(eij) for all directed edges, which are calculated by the minimum of the time interval taken for the migration (i.e., the time duration being disconnected between two consecutive connections). Third, GAAS takes the minimum of the weights assigned for the outgoing edges from a vertex and assigns this value to the vertex as a vertex weight, w(i). Fourth, GAAS assigns another weight d(i) to each of vertices by taking fraction of average of the connection time durations to the corresponding Wi-Fi AP.

To maximize the connection opportunities, GAAS sets the scheduling interval as w(i) (i.e., minimum of transit interval for the current node) when user is identified to be in transit state and sets it to d(i) (i.e., average of stay duration) when the user is not in transit. The scheduling interval s(k) is progressively updated for each activation of k. The steps are summarized as Algorithm 5.

---

Algorithm 5 GAAS: Graph-based Adaptive Activation Scheduling

Evaluate vertex weights, w(i) and d(i).
    $w(\vec{e}_{ij}) = \min(T_{ij})$ where $\vec{e}_{ij} \in E, i,j \in V$
    $w(i) = \min_{k | e_{ik} \in E}(w(\vec{e}_{ik}))$
    $d(i) = \text{avg}(D_i)$ where $i \in V$
Start activation with GAAS
k ← 1, j ← 1
while GAAS is running do
    if $k^{th}$ activation detects a Wi-Fi AP, $v \in V$ then
        π(j) = v
        s(k) = d(v)
        j = j + 1
    else
        if j = 0 then
            $s(k) = \min_{i \in v} w(i)$
        else
            s(k) = w(π(j − 1))
        end if
    end if
    Apply the next scheduling interval, s(k)
    k = k + 1
end while

---

It is true that the scheduler can be more efficient if other sensor information together such as accelerometers and Wi-Fi signal strengths variation are combined together [14]. However, we avoid such techniques in GAAS as they require continuous monitoring and computations of such information.

Figure 13:
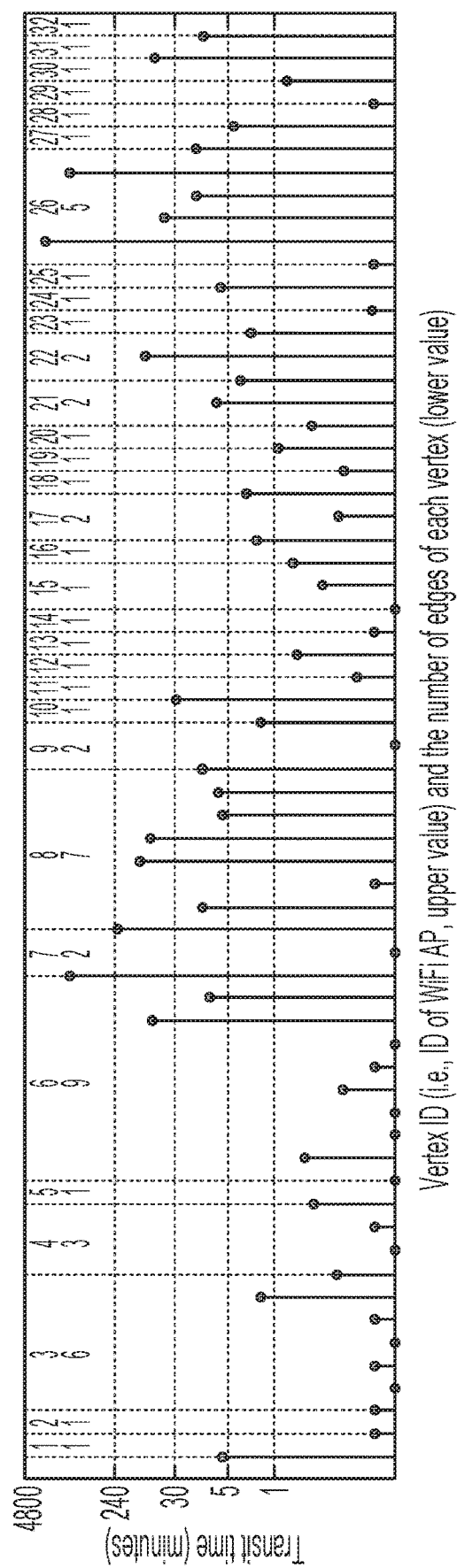
FIG. 13 is a distribution of minimum transit times s(i) for the edges of each vertex. The distance between two vertical dotted lines indicates the degree (i.e., the number of edges) of each vertex. The vertex ID and the degree of each vertex are given in the top part of each figure.
Figure 14:
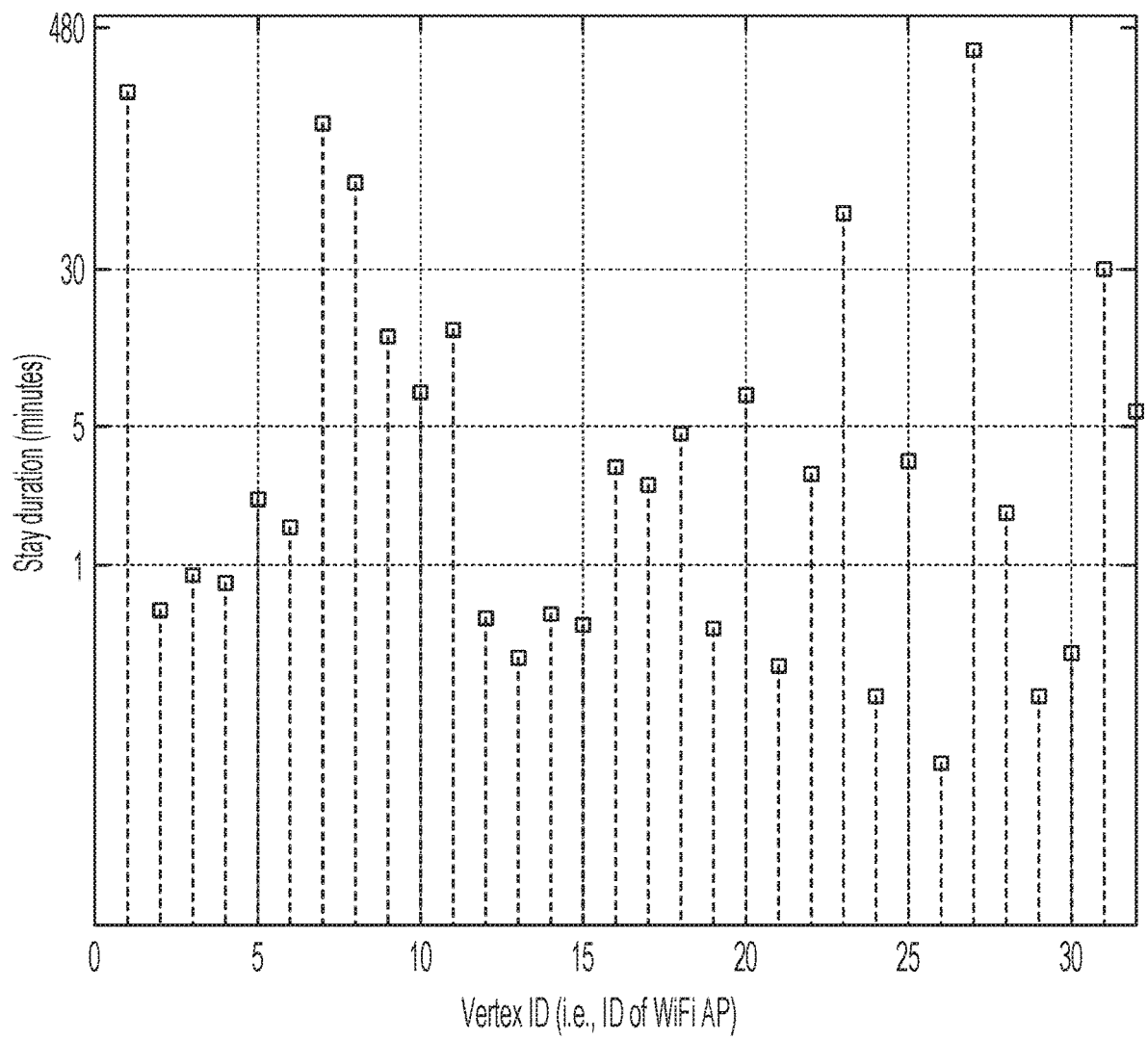
FIG. 14 is a graph of the distribution of average stage relation d(i) at each vertex (each Wi-Fi access point)
Figure 15:
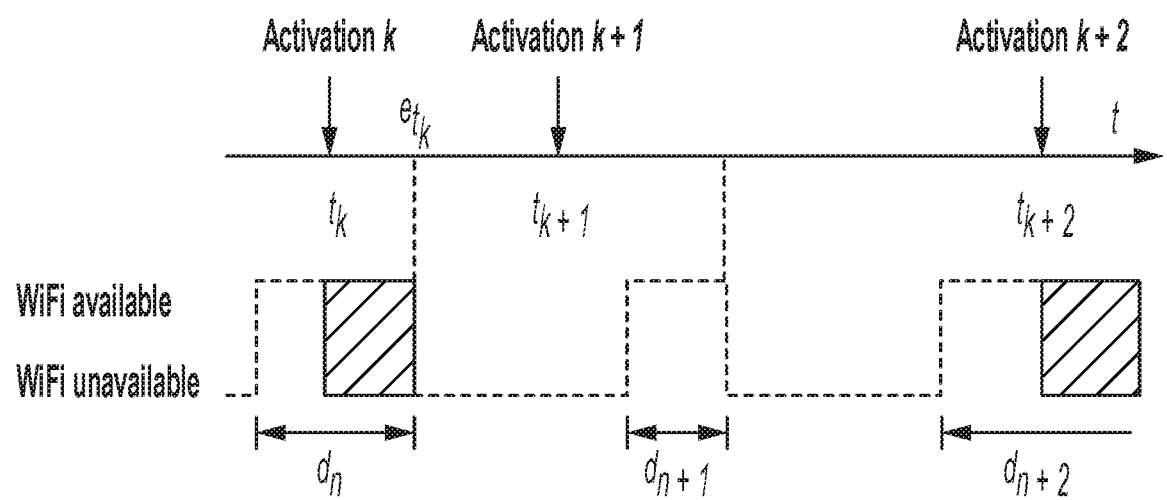
FIG. 15 is a graph illustrating an example of the operation of GAAS. The main performance metric, temporal utilization is defined to be the ratio of total gray regions out of total Wi-Fi availability.

FIG. 13 shows weights for all outgoing edges from the entire set of Wi-Fi APs identified by the daily Wi-Fi usage traces. All edges corresponding to a vertex are between two vertical lines and minimum among them determines the weight w(i) of a vertex i. FIG. 14 shows another weight d(i) which denotes the average stay time for each vertex. These figures show that Algorithm 5 of GAAS will let computations of DirectWi-Fi be scheduled in a variety of intervals ranging from one second to 480 minutes.

Figure 16:
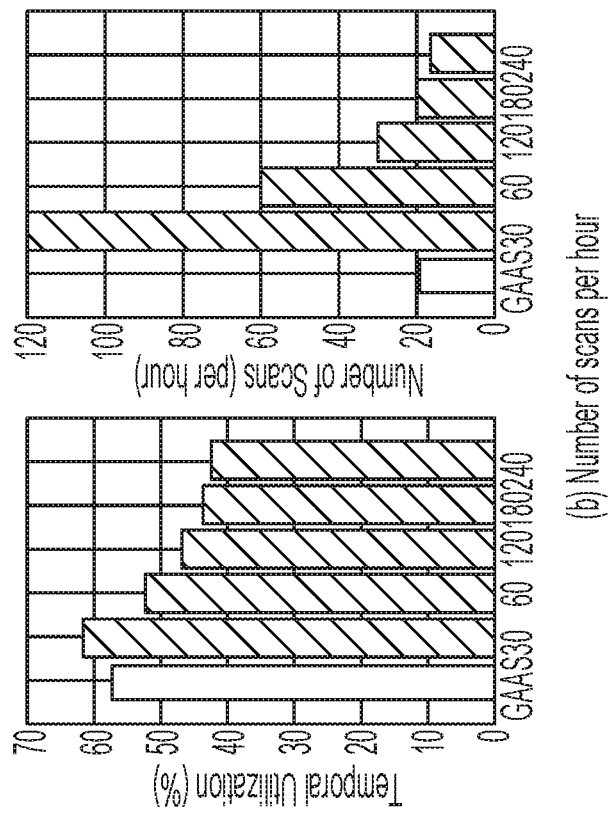
FIG. 16 illustrates the performance of GAAS against naïve constant scanning schemes with 30-240 second intervals over two days of traces.
Figure 16:
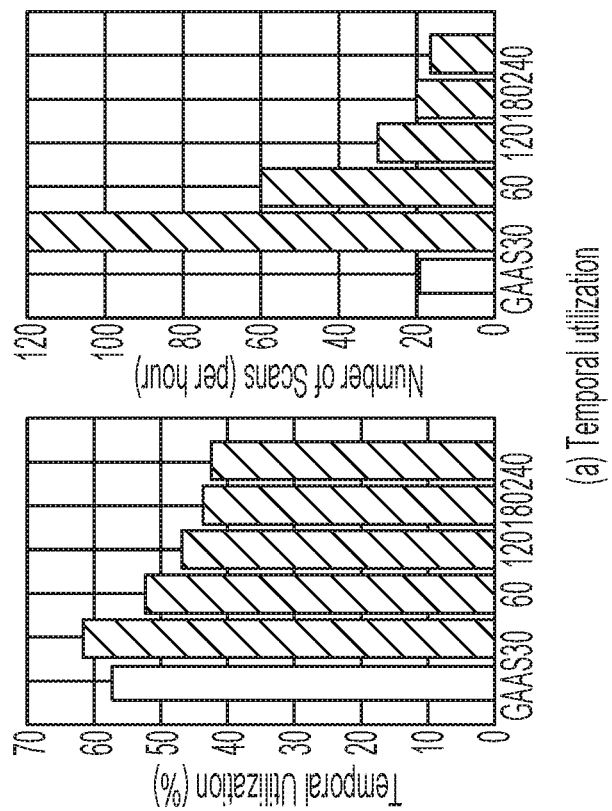

FIG. 16 compares the performance of GAAS and a naive regular scheduling with various constant intervals through forty eight hours of Wi-Fi usage traces after one week of training. The performance metric, temporal utilization (η) shown in FIG. 16(a) is defined to be the time portion between the sum of durations that an algorithm can enjoy Wi-Fi connectivity and the total duration that Wi-Fi is available in the ground truth, as follows:

$$\eta \approx \frac{\sum_{k \in C(t_s, t_e)} e_{t_k} - t_k}{\sum_{n \in W(t_s, t_e)} d_n}$$

where $C(t_s, t_e)$, $W(t_s, t_e)$, $e_{t_k}$ and $d_n$ represent the set of activations which successfully detected Wi-Fi opportunities during the test period $[t_s, t_e]$, the set of Wi-Fi opportunities within $[t_s, t_e]$, the time when Wi-Fi connectivity ends for the $k^{th}$ activation which is successful and the duration of $n^{th}$ Wi-Fi availability, respectively. The number of activations per hour shown in FIG. 16(b) gives the approximation of average power consumption for each scheme. GAAS shows about 60% in temporal utilization with only activating 19 computations per hour while naive scheme for an interval of 60 seconds has slightly lower temporal utilization with three times more activations. Similarly, GAAS is comparable in the number of activations to the naïve scheme for an interval of 240 seconds whose temporal utilization is only around 40%.

Section 7.2: Profile Sharing

In this section, the possibility of sharing profiles among multiple smart devices is discussed. The system of sharing profiles can benefit scenarios when a smart device visits a new location. In this scenario, the device needs to spend several days to construct its own profiles for all connected Wi-Fi APs. However, if there is a profile sharing service that can host profiles created by devices which have already constructed profiles for that area, the service can share them to the newly joined devices. This allows DirectWi-Fi to immediately work even for new areas. To implement this service, several technical challenges such as signal strength calibration for different devices, aggregation of the collected profiles for the same Wi-Fi AP, and prediction of areas that a user can potentially visit needs to be overcome. These topics are beyond the scope of this paper but we are interested in developing such techniques in future.

However, the profile sharing service can be implemented as follows: It first collects profiles created for all MAC addresses of Wi-Fi APs from different users, aggregates/ stores the profiles in a geographically segmented database. Whenever a device visits a new region, it requests profiles from the service and the service then responds with suitable profiles for that region. The database can be maintained up-to-date with minimal burden to smart devices by triggering them to upload the most recent profiles regularly only when the device is connected to a Wi-Fi AP and it is connected to a charger.

Section 8: Conclusions

This document emphasizes the importance of an efficient Wi-Fi scan method for battery-limited smart devices and proposes a new system, DirectWi-Fi which enables faster and energy efficient Wi-Fi AP connection. DirectWi-Fi builds cellular signal profiles for each connected Wi-Fi AP and later with few cellular signals as input recommends the best Wi-Fi AP to connect to whenever requested.

The implementation of this system tries to connect directly to the recommended Wi-Fi APs without scanning all of the channels, thus saving time and energy for connection. The scheme implemented on an Android based smart phone is shown to save more than 70% energy per each scan. Also it is able to identify available Wi-Fi APs on an average of 1.3 single channel scan trials and wastes only 0.9 trials on an average in case there is no available Wi-Fi AP. Further, a graph-based activation scheduler which leverages on regularity in human mobility ensuring high connectivity for low energy consumption is described. Through trace-driven emulations over real smart phone usage traces, DirectWi-Fi is estimated to stretch total battery life by about 8~11%. DirectWi-Fi can immediately benefit smart devices, and it can play a key role for up-coming cloud services which can be proliferated when maximal data offloading to Wi-Fi networks with minimal energy consumption is available.

Exemplary Process

Figure 17:
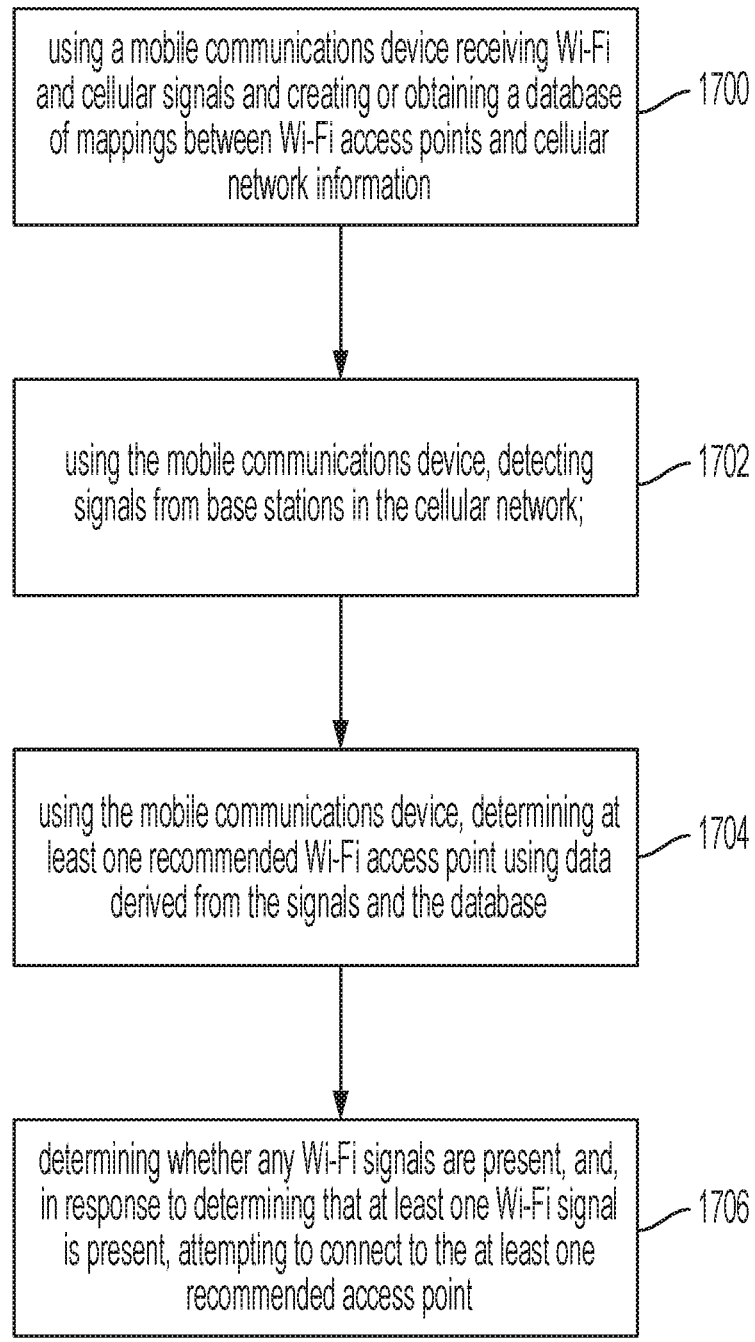
FIG. 17 is a flow chart illustrating an exemplary process for reducing Wi-Fi scanning using cellular network to Wi-Fi access point mapping information according to an embodiment of the subject matter described herein.

FIG. 17 is a flow chart illustrating exemplary steps for reducing Wi-Fi scanning using cellular network to Wi-Fi access point mapping information according to an embodiment of the subject matter described herein. Referring to FIG. 17, in step 1700, using a mobile communications device, Wi-Fi and cellular signals are received and a database of mappings between Wi-Fi access points and cellular network information is created or obtained. As stated above, the process of obtaining the mappings may be performed during a training phase and/or continuously during operation of a mobile communications device. Alternatively, the mappings may be loaded onto the mobile communications device by a third party service.

In step 1702, the mobile communications device detects signals from base stations in the cellular network. In step 1704, using the mobile communications device, at least one recommended Wi-Fi access point is determined using data derived from the signals and the database. For example, as set forth above, any of the algorithms described herein may be used to recommend a Wi-Fi access point to which the mobile communications device should seek to connect.

In step 1706, it is determined whether any Wi-Fi signals are present, and, in response to determining that at least one Wi-Fi signal is present, the mobile communications device attempts to connect to the recommended access point. For example, as set forth above, if the recommended Wi-Fi access point is present, an attempt will be made to connect to that access point. If no Wi-Fi signals are present, Wi-Fi scanning may be suppressed.

[1] iCloud, apple.com. http://www.apple.com/icloud/.
[2] Monsoon Solutions, Inc., www.msoon.com/LabEquipment/PowerMonitor.
[3] Skyhook. http://www.skyhookwireless.com/.
[4] Cisco visual networking index: Global mobile data traffic fore-cast update, 2010-2015, February 2011.
[5] BALASUBRAMANIAN, A., MAHAJAN, R., AND VENKATARA-MANI, A. Augmenting mobile 3g using Wi-Fi. In Proceedings of ACM MobiSys (San Francisco, Calif., 2010).
[6] GONZALEZ, M. C., HIDALGO, C. A., AND BARABASI, A.-L. Understanding individual human mobility patterns. Nature 453 (June 2008), 779-782.
[7] KIM, K.-H., MIN, A. W., GUPTA, D., MOHAPATRA, P., AND SINGH, J. P. Improving energy efficiency of wi-fi sensing on smartphones. In Proceedings of IEEE INFOCOM (Shanghai, China, 2011).
[8] LAMARCA, A., CHAWATHE, Y., CONSOLVO, S., HIGHTOWER, J., SMITH, I., SCOTT, J., SOHN, T., HOWARD, J., HUGHES, J., POTTER, F., TABERT, J., POWLEDGE, P., BORRIELLO, G., AND SCHILIT, B. Place lab: Device positioning using radio beacons in the wild. In Proceedings of Pervasive Computing (2005).
[9] LEE, K., HONG, S., KIM, S., RHEE, I., AND CHONG, S. SLAW: A new human mobility model. In Proceedings of IEEE INFOCOM (San Diego, Calif., 2009).
[10] LEE, K., RHEE, I., LEE, J., TI, Y., AND CHONG, S. Mobile data offloading: How much can Wi-Fi deliver? In Proceedings of ACM CoNEXT (Philadelphia, Pa., 2010).
[11] MANWEILER, J., AND CHOUDHURY, R. R. Sleepwell: Avoiding the rush hours: Wi-Fi energy management via traffic isolation. In Proceedings of ACM Mobisys (Washington, D.C., 2011).
[12] MIKA, K. L., RAENTO, M., AND TOIVONEN, H. Adaptive on-device address recognition. In Proceedings of the Second International Conference on Pervasive Computing (2004), Springer Verlag, pp. 287-304.
[13] PAEK, J., KIM, K., SINGH, J., AND GOVINDAN, R. Energy-efficient positioning for smartphones using cell-id sequence matching. In Proceedings of ACM Mobisys (Washington, D.C., 2011).

[14] RAVINDRANATH, L. S., NEWPORT, C., BALAKRISHNAN, H., AND MADDEN, S. Improving Wireless Network Performance Using Sensor Hints. In Proceedings of USENIX NSDI (Boston, Mass., 2011).

[15] ROZNER, E., NAVDA, V., RAMJEE, R., AND RAYANCHU, S. Napman: Network-assisted power management for Wi-Fi devices. In Proceedings of ACM Mobisys (San Francisco, Calif., 2010).

[16] SHIH, E., BAHL, P., AND SINCLAIR, M. Wake on wireless: An event driven energy saving strategy for battery operated devices. In Proceedings of ACM MobiCom (Atlanta, Ga., 2002).

[17] THIAGARAJAN, A., RAVINDRANATH, L. S., BALAKRISHNAN, H., MADDEN, S., AND GIROD, L. Accurate, Low-Energy Trajectory Mapping for Mobile Devices. In Proceedings of USENIX NSDI (Boston, Mass., 2011).

[18] VARSHAVSKY, A., DE LARA, E., HIGHTOWER, J., LAMARCA, A., AND OTSASON, V. Gsm indoor localization. Elsevier Pervasive Mobile Computing 3 (December 2007), 698-720.

[19] WU, H., TAN, k., Liu, J., AND ZHANG, Y. Footprint: cellular assisted Wi-Fi ap discovery on mobile phones for energy saving. In Proceedings of ACM WINTECH (Beijing, China, 2009).

[20] ZHANG, X., AND SHIN, K. G. E-mili: energy-minimizing idle listening in wireless networks. In Proceedings of ACM MobiCom (Las Vegas, Nev., 2011).

What is claimed is:

1. A method for reducing Wi-Fi scanning by a mobile communications device, the method comprising:
   using the mobile communications device, receiving Wi-Fi signals and cellular signals and creating or obtaining a database of mappings between Wi-Fi access points and information about a cellular network to form profiles for at least some Wi-Fi access points to which the mobile communications device communicatively couples, each profile including information about the cellular signals from a plurality of base stations of the cellular network that are detected when the mobile communications device is communicatively coupled to a Wi-Fi access point associated with the profile;
   using the mobile communications device, detecting signals from base stations in the cellular network;
   using the mobile communications device, determining at least one recommended Wi-Fi access point using a probability of observing a sequence of signal strengths from a base station from the plurality of base stations and base station set matching of the signals from the plurality of base stations, the plurality of base stations observable when the mobile communications device is communicatively coupleable to the Wi-Fi access point associated with the profile and using the mappings from the database and the profiles; and
   in response to determining the at least one recommended Wi-Fi access point, attempting to connect to the at least one recommended access point while avoiding a full Wi-Fi communication channel scan by limiting the mobile communications device to scanning one or more Wi-Fi communication channels associated with the at least one recommended Wi-Fi access point.

2. The method of claim 1 wherein receiving the Wi-Fi signals and the cellular signals includes continually receiving the Wi-Fi signals and the cellular signals and updating the database of mappings.

3. The method of claim 1 wherein the information includes a cell identifier.

4. The method of claim 1 wherein the information about the cellular signals includes measured signal strengths from observable base stations in range of the mobile communications device when the mobile communications device is communicatively coupled to the Wi-Fi access point associated with the profile.

5. The method of claim 4 wherein the probability of observing a sequence of signal strengths is based on probability density functions of the signal strengths of the plurality of base stations.

6. The method of claim 1 comprising, in response to determining that no recommended Wi-Fi access point is likely to be present based on data derived from the mappings, suppressing Wi-Fi scanning.

7. A system for reducing Wi-Fi scanning by a mobile communications device, the system comprising
   a direct Wi-Fi manager for receiving Wi-Fi signals and cellular signals and creating or obtaining a database including mappings between Wi-Fi access points and information about a cellular network to form profiles for at least some of the Wi-Fi access points to which the mobile communications device communicatively couples, each profile including information about the cellular signals from a plurality of base stations of the cellular network that are detected when the mobile communications device is communicatively coupled to a Wi-Fi access point associated with the profile, the direct Wi-Fi manager being further configured for detecting signals from base stations in the cellular network and for determining at least one recommended Wi-Fi access point using a probability of observing a sequence of signal strengths from a base station from the plurality of base stations and base station set matching of the signals observable when the mobile communications device is communicatively coupleable to the Wi-Fi access point, the profiles, and the mappings from the database; and
   a direct Wi-Fi service for, in response to receiving an identification of the at least one recommended Wi-Fi access point, attempting to connect to the at least one recommended access point while avoiding a full Wi-Fi communication channel scan by limiting a mobile communications device to scanning one or more Wi-Fi communication channels associated with the at least one recommended Wi-Fi access point.

8. The system of claim 7 wherein the direct Wi-Fi manager is configured to continually receive the Wi-Fi signals and cellular signals and update the mappings.

9. The system of claim 7 wherein the information includes a cell identifier.

10. The system of claim 7 wherein the information about the cellular signals includes measured signal strengths from observable base stations in range of the mobile communications device when the mobile communications device is communicatively coupled to the Wi-Fi access point associated with the profile.

11. The system of claim 10 wherein the probability of observing a sequence of signal strengths is based on probability density functions of the signal strengths of the plurality of base stations.

12. The system of claim 7 wherein the direct Wi-Fi service is configured to suppress Wi-Fi scanning in response to determining that no recommended Wi-Fi access point is likely to be present based on the mappings.

13. A non-transitory computer readable medium having stored thereon instructions that are executable by a processor of a mobile communications device to cause the mobile communications device to perform steps comprising:

受信 receiving Wi-Fi signals and cellular signals and creating or obtaining a database of mappings between Wi-Fi access points and information about a cellular network to form profiles for at least some of the Wi-Fi access points to which the mobile communications device communicatively couples, each profile including information about the cellular signals from a plurality of base stations of the cellular network that are detected when the mobile communications device is communicatively coupled to a Wi-Fi access point associated with the profile;

detecting signals from base stations in the cellular network;

determining at least one recommended Wi-Fi access point using a probability of observing a sequence of signal strengths from a base station from the plurality of base stations and base station set matching of the signals from the plurality of base stations, the plurality of base stations observable when the mobile communications device is communicatively coupleable to the Wi-Fi access point associated with the profile, the profiles, and the mappings from the database; and in response to determining the at least one recommended Wi-Fi access point, attempting to connect to the at least one recommended access point while avoiding a full Wi-Fi communication channel scan by limiting the mobile communications device to scanning one or more Wi-Fi communication channels associated with the at least one recommended Wi-Fi access point.

14. The non-transitory computer readable medium of claim 13, wherein the information about the cellular signals includes measured signal strengths from observable base stations in range of the mobile communications device when the mobile communications device is communicatively coupled to the Wi-Fi access point associated with the profile.

15. The non-transitory computer readable medium of claim 14, wherein the probability of observing a sequence of signal strengths is based on probability density functions of the signal strengths of the plurality of base stations.

16. The non-transitory computer readable medium of claim 13, wherein the instructions are executable by the processor to cause the mobile communications device to, in response to determining that no recommended Wi-Fi access point is likely to be present based on the mappings, suppress Wi-Fi scanning.

17. The method of claim 1, wherein detecting the signals from the base stations in the cellular network is subsequent to creating or obtaining the database of mappings between the Wi-Fi access points and the cellular network information.

18. The method of claim 1, wherein the at least one recommended Wi-Fi access point comprises a first Wi-Fi access point and a second Wi-Fi access point,
wherein attempting to connect to the at least one recommended access point comprises:
scanning a first Wi-Fi communications channel associated with the first Wi-Fi access point; and
in response to failing to connect to the first Wi-Fi access point, scanning a second Wi-Fi communications channel associated with the second Wi-Fi access point.

19. The method of claim 1, wherein the information about the cellular signals from one or more base stations includes data about signals from observable base stations that include a connected base station to the mobile communications device and one or more neighboring base stations.

* * * * *